United States Patent
Yungster et al.

(10) Patent No.: US 11,102,546 B1
(45) Date of Patent: Aug. 24, 2021

(54) SYSTEMS AND METHODS FOR OBTAINING AND DISPLAYING VIDEOS

(71) Applicant: LONGTAIL AD SOLUTIONS, INC., New York, NY (US)

(72) Inventors: Nir Yungster, Brooklyn, NY (US); Olga Bane, New York, NY (US); Rik Heijdens, RH Beuningen (NL); Clarence Kam, New York, NY (US); Graham Edge, New York, NY (US)

(73) Assignee: Longtail Ad Solutions, Inc., New York, NY (US)

( * ) Notice: Subject to any disclaimer, the term of this patent is extended or adjusted under 35 U.S.C. 154(b) by 0 days.

(21) Appl. No.: 16/868,141

(22) Filed: May 6, 2020

(51) Int. Cl.
*H04N 21/443* (2011.01)
*H04N 21/442* (2011.01)
*H04N 21/437* (2011.01)
*H04N 21/81* (2011.01)

(52) U.S. Cl.
CPC ....... *H04N 21/4438* (2013.01); *H04N 21/437* (2013.01); *H04N 21/44204* (2013.01); *H04N 21/812* (2013.01)

(58) Field of Classification Search
CPC ............ H04N 21/4438; H04N 21/437; H04N 21/44204; H04N 21/812; G06Q 30/0277; G06Q 30/02; G06Q 30/0241; G06Q 30/0253; G06Q 30/0273
USPC .............................. 725/14; 705/14.4, 14.41
See application file for complete search history.

(56) References Cited

U.S. PATENT DOCUMENTS

| | | | | |
|---|---|---|---|---|
| 10,102,549 B1* | 10/2018 | Cory | ............... | G06Q 30/0275 |
| 10,387,911 B1* | 8/2019 | Shaw | ............... | G06Q 30/0248 |
| 2014/0136344 A1* | 5/2014 | Ringdahl | ........... | G06Q 30/0273 705/14.71 |
| 2014/0195330 A1* | 7/2014 | Lee | ................. | G06Q 30/0242 705/14.41 |
| 2016/0191995 A1* | 6/2016 | el Kaliouby | ........... | G16H 50/70 725/12 |
| 2017/0372380 A1* | 12/2017 | Candiotti | ............ | G06Q 30/0277 |
| 2020/0034874 A1* | 1/2020 | Narayan | ............ | G06Q 30/0277 |
| 2020/0204837 A1* | 6/2020 | Boyd | ................... | H04N 21/812 |

OTHER PUBLICATIONS

C. Wang, A. Kalra, L. Zhou, C. Borcea and Y. Chen, "Probabilistic Models for Ad Viewability Prediction on the Web," in IEEE Transactions on Knowledge and Data Engineering, vol. 29, No. 9, pp. 2012-2025, Sep. 1, 2017, doi: 10.1109/TKDE.2017.2705688 (Year: 2017).*

* cited by examiner

*Primary Examiner* — Cynthia M Fogg
(74) *Attorney, Agent, or Firm* — FisherBroyles, LLP

(57) ABSTRACT

Systems and methods for obtaining and playing video advertisements in conjunction with play of video content use information about the viewability of an instantiation of a video player software application. An instantiation of the video player software application generates a viewability score which is intended to reflect a degree of confidence that the instantiation of the video player software application is located on a part of a webpage that currently appears on a user's display screen. Information used to generate the viewability score can be gathered during play of a video. The information used to generate a viewability score can include information about user performed actions and information that indicates the degree to which the user is engaged by a video.

21 Claims, 13 Drawing Sheets

SYSTEMS AND METHODS FOR OBTAINING AND DISPLAYING VIDEOS

BACKGROUND

It is now common for a website to offer video content to the users viewing the website. Typically, a page of a website will include one or more embedded video players, and each of the embedded video players is configured to play a different video. A user initiates playback of a video by issuing some positive play intent action, such as clicking on a play button of the video player.

In many instances, the website publisher who creates a website derives revenue not from use of the website, but rather from advertisers who place advertisements on the website. In the past, most advertising was in the form of display or banner advertisements. Display or banner advertisements could be positioned at various locations on a page of a website. If a user viewing the website wished to obtain more information about an advertisement, the user would typically select or click upon the display advertisement, and the user's browser would then navigate to and load a website run by the advertiser.

In many instances, a website publisher will subscribe to an advertising service to obtain advertisements that are then displayed on the publisher's website. Thus, many website publishers do not have individual contracts with the advertisers themselves, but rather obtain advertisements through an advertising service. The advertising service, in turn, sets up relationships with a large number of different advertisers and essentially acts as a middleman between website publishers and the advertisers.

When a user navigates to a particular webpage, browser software on the user's computer will render the webpage on the user's display based upon computer code embedded in the webpage. The user typically does not see the embedded computer code that enables the browser to render the webpage. However, the browser software application uses the embedded computer code to determine what to display to the user.

If a website publisher decides to place one or more banner or display advertisements on a webpage, the website publisher can include embedded computer code in a header of the webpage that dictates where the advertisements will be placed, the size of the advertisements, and various other information. The browser software utilizes the embedded computer code relating to the advertisements to request advertisements from an advertising service. When an advertising service receives such a request, the request may include information about what will be presented on the webpage. This allows the advertising service to seek out advertisements that are relevant to the content of the webpage which is being rendered.

In some instances, the advertising service might seek bids from multiple different advertisers, asking if they would like to place an advertisement on the webpage that is being rendered by the browser software. The request for a bid may include information about the content of the webpage being rendered that was originally provided to the advertising service by the browser software. If the advertising service requests bids, various advertisers would provide bids that indicate the prices the respective advertisers are willing to pay to have their advertisement appear on the webpage being rendered. The advertising service then reviews all submitted bids and selects a winning bid.

Once the advertising service has selected advertisements for the webpage, the advertising service provides information back to the browser software that enables the browser software to obtain the selected advertisements. This information could be, for example, a URL at which an advertisement asset is stored. The browser software uses the information provided by the advertising service to obtain the selected advertisements, and the advertisements are then displayed at the appropriate locations on the webpage as part of the processes of rendering the webpage.

While the above-described process works well for display or banner ads, this process has various problems and difficulties when browser software is attempting to obtain a video advertisement that will be played to a user in conjunction with the play of video content.

As noted above, many publishers now place video content on their websites to induce users to navigate the website and view material. When a user requests the play of a video, it is possible to also play one or more video advertisements to the user that the user must watch in order to view the desired video content. In addition, and particularly in the case of a long video, the user may be forced to watch several short video advertisements at various different times as the full video content is played to the user. Because most video content on websites is relatively short in duration, video advertising is typically played immediately before the user is able to watch a desired video. Such advertisements are sometimes referred to as "pre-rolls."

When a webpage includes video content, one or more instantiations of a video player software application are generated as the webpage is rendered, and a different video is typically loaded within each video player instantiation. In the case of video advertisements, it typically is not the browser software that is responsible for obtaining a video advertisement. Instead, each instantiation of a video player software application is responsible for obtaining a video advertisement that can be played in connection with the video that is loaded in the instantiation of the video player. Because of the different nature of video advertisements, and the way in which video advertisements are acquired and played, there are problems and drawbacks associated with video advertisements that are not present in connection with static display or banner advertisements.

In the case of banner or display ads, because the general content of the webpage is usually known in advance, it is easy to send a request to an advertising service for relevant display or banner ads immediately as the webpage begins to load. In the case of video advertisements, however, is often difficult to know exactly what type of video will be played by an instantiation of a video player software application. Often, only the title of the video is known, and the title of the video may not be indicative of the actual content of the video. As a result, it becomes more difficult for an advertising service to identify an appropriate video advertisement to play in connection with the video that is loaded in the instantiation of the video player software application.

As mentioned above, it is the instantiation of the video player software application that sends a bid request to an advertising service for a video advertisement. Unfortunately, it can be difficult or impossible for the instantiation of the video player software application to determine whether the video player software application will be positioned at a viewable portion of the website at the time a requested video advertisement is played. In other words, by the time a video advertisement is obtained and begins playing, the video player software application may be positioned on a portion of the webpage that does not presently appear on the user's display screen. If that is the case, then any video advertisement played on the video player software application will not be seen by the user.

An advertiser can sometimes resort to independent review or rating services to obtain information about individual websites that can be used to determine whether it is worthwhile to bid to play a video advertisement on individual websites. Such review and rating services can sometimes indicate what overall percentage of video advertisements sent to a specific website are actually viewable to a user. If the percentage is too low for a particular website, an advertiser can decline to bid to play video advertisements on the website.

Unfortunately, such website ratings cannot take into account the actual conditions that exist for a user when a webpage is rendered on the user's display screen and when a video player software application is instantiated on the website and thereafter sends a bid request for a video advertisement to an advertising service. In some instances, the user may have scrolled downward immediately after the webpage was rendered, resulting in an instantiation of a video player software application located at the top of the webpage no longer being viewable to the user. In other instances, if the user did not scroll down after the webpage was rendered, the same instantiation of the video player software application would still be visible to the user. The overall website ratings that are provided to advertisers by review or rating services cannot take these sorts of variables into account and can only make judgments based on highly empirical data. As a result, advertisers cannot be confident that the video advertisements they pay to have played on a website will actually even be viewable to users before they bid to have the video advertisements played.

DETAILED DESCRIPTION

Figure 1:
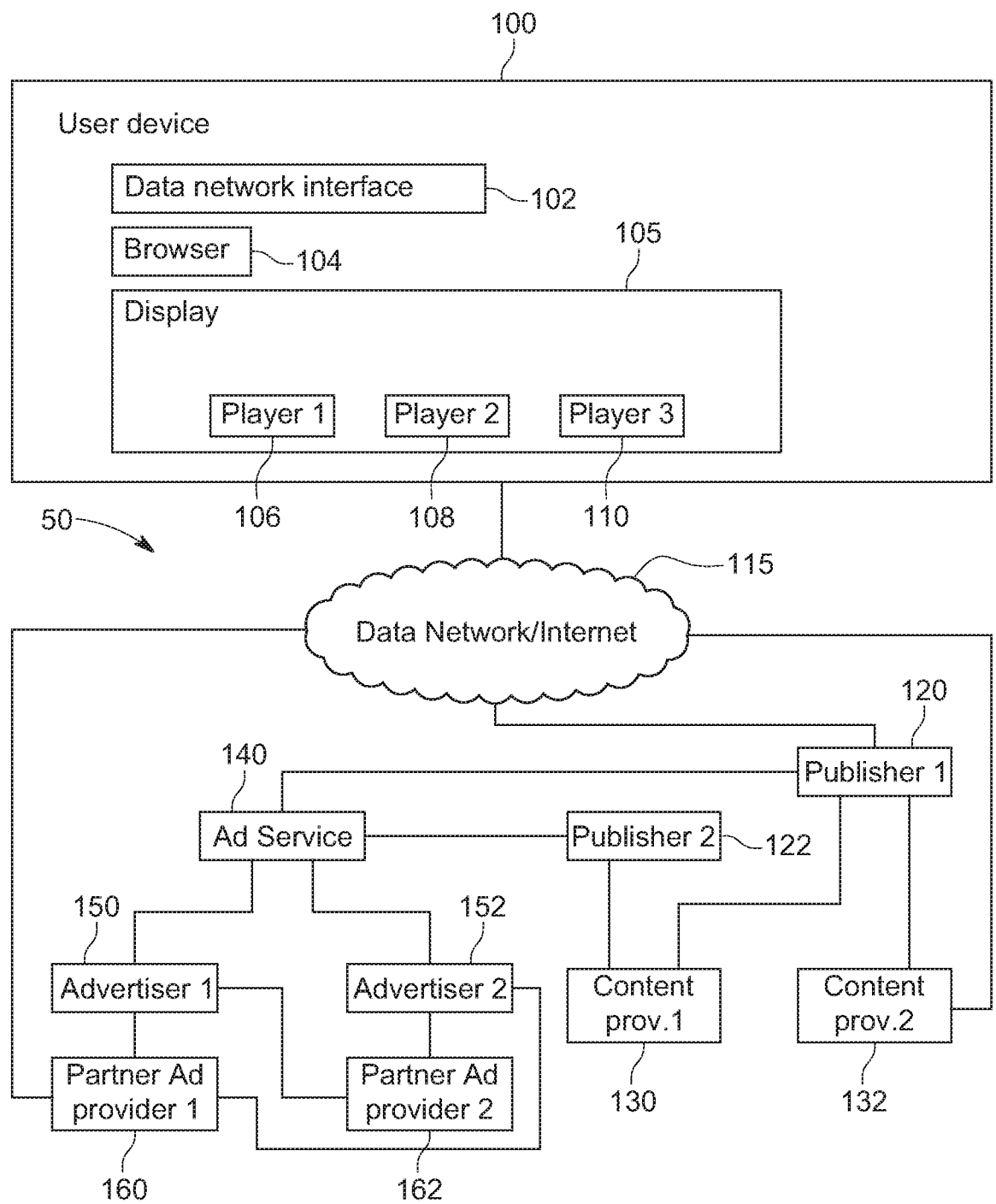
FIG. 1 is a diagram illustrating a communications environment in which systems and methods embodying the invention can be performed.

FIG. 1 illustrates a communications environment 50 in which a video player software application embodying the invention could be used. As shown in FIG. 1, a user computing device 100 includes a data network interface 102 for communicating with a data network such as the Internet 115. A browser software application 104 is resident on the user's computing device 100. The browser software application 104 renders webpages on a display 105 of the user computing device 100.

As also shown in FIG. 1, the browser software application 104 could render a webpage on the display 105 that includes three separate instantiations of a video player software application 106/108/110. Each individual instantiation of the video player software application would be loaded with a different video.

The communications environment 50 also includes a first website publisher 120 and a second website publisher 122. The first and second website publishers 120/122 provide webpages to user's browser software application 104 via the Internet 115. The first and second website publishers 120/122 obtain video content from content provider 130 and content provider 132, as well as from other sources. A website publisher also could create its own video content, in addition to acquiring video content from other sources.

As explained above, the first and second website publishers 120/122 can engage in contractual relationships with an advertising service 140 to obtain advertisements which will be displayed on the publishers' websites. The advertising service 140, in turn, obtains advertisements from a first advertiser 150 and a second advertiser 152. Those of ordinary skill in the art will appreciate that there would in fact be a very large number of advertisers that provide advertisements to an advertising service 140. Moreover, there can be multiple advertising services, each of which contracts with multiple advertisers and multiple website publishers. Thus, the depiction provided in FIG. 1 should in no way be considered limiting. The process by which the advertising service 140 provides advertisements so that the advertisements can be displayed or played on a publisher's website will be described in greater detail below in connection with FIG. 5.

The communications environment 50 illustrated in FIG. 1 also includes a first partner advertising provider 160 and a second partner advertising provider 162. As will be explained in detail below, a partner advertising provider can provide video advertisements for play on a publisher's website in a more efficient and faster way than would be done via traditional methods that utilize an advertising service 140.

Figure 2:
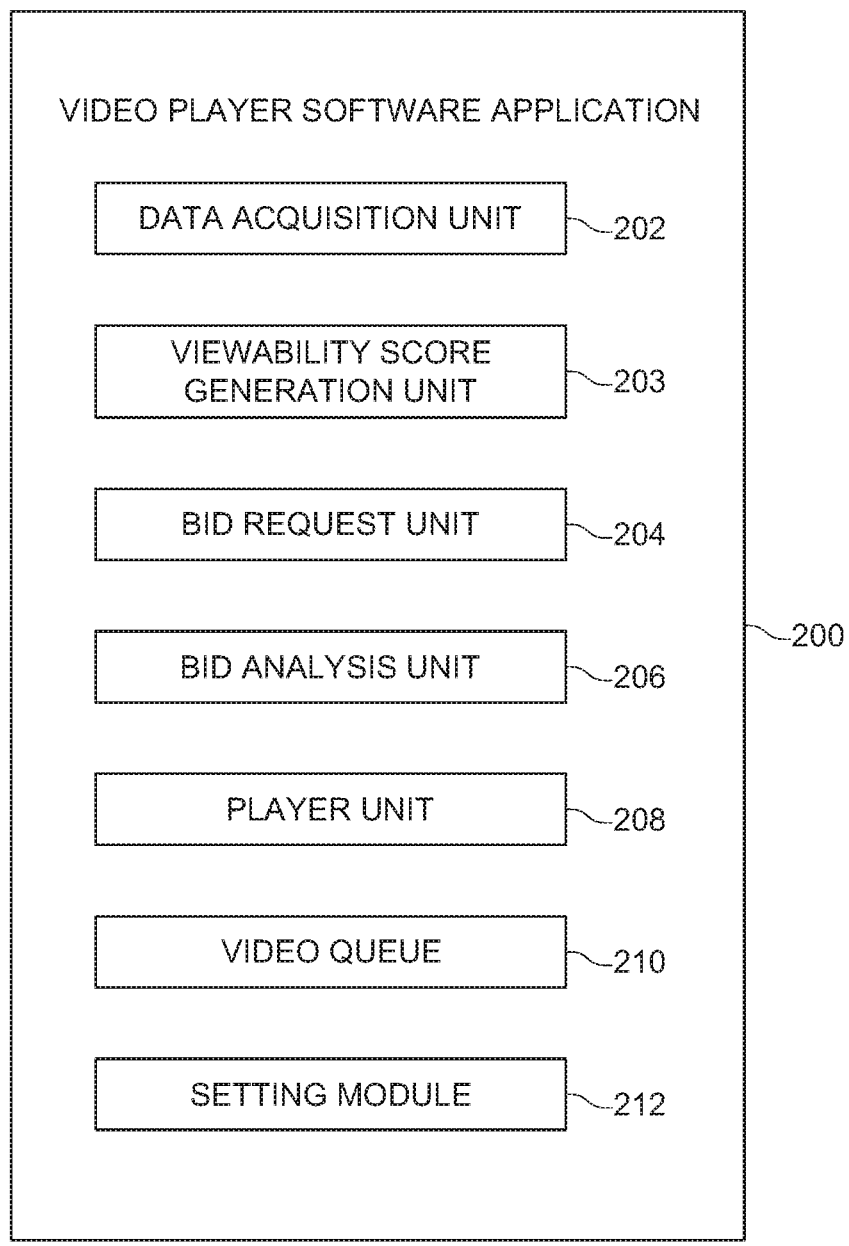
FIG. 2 is a diagram of various elements of a video player software application.

FIG. 2 illustrates selected elements of a video player software application 200. As noted above, when a browser renders a webpage, the browser could instantiate multiple instances of the video player software application 200 on the webpage, and each instantiation of the video player software application 200 could be loaded with a different video.

The video player software application 200 includes a data acquisition unit 202 that obtains various items of information about the particular instantiation of the video player software application 200. Those items of information could include the title of a video that has been loaded, as well as various items of information about the content of the video.

The data acquisition unit 202 might also obtain information about the appearance of the video player on the webpage, such as a size of the video player within the webpage and its location on the webpage. Information about the location of the video player software application on a webpage can include whether the video player is currently within a viewable part of the webpage as presented on the user's display screen. In some instances, a webpage will be large and not all of the webpage will be presented on the user's display screen at the same time. This means that the video player may be positioned on a portion of the webpage that is not visible to the user. It would then be necessary for the user to take a positive action to navigate or scroll to different portion of the webpage in order for the video player to become visible to the user.

The data acquisition unit 202 might also obtain various items of information about settings of the video player software application 200, such as the resolution of a loaded video, changes in the resolution, bitrate, information about video buffering and playback errors, a volume setting, a language setting, as well as various other similar settings. The data acquisition unit 202 may also collect various items of information about the webpage such as the webpage url, the webpage title, the webpage text and the webpage html. The data acquisition unit 202 may also capture information about the performance of the player unit 208 such as the time it takes to setup the player on the webpage and the time it takes for playback to begin once the user issues a play command.

The data acquisition unit 202 can also obtain and/or collect various other items of information that may be relevant to whether the video player software application 200 is likely to be viewable to the user when a video advertisement is played. The information can be relevant to the play of a video currently loaded in the instantiation of the video player software application, or information relevant to playback of previous videos. This can include information about actions that a user has taken in connection with videos previously played to the user by the instantiation of the video player software application 200. For example, information about the user selecting various buttons on the video player such as a fast forward or rewind button, a pause button or causing the video player to increase to full-screen mode. This information can also include whether the user hovered a selection icon over certain parts of the video player or selected recommended content. This could also include information about whether the user selected or de-selected captioning. This information can also include whether the user previously scrolled the webpage, and if so how much and how often. The information can also include whether the user issued a play command to cause the current or previous videos to play, or whether the current or previous videos were autoplayed.

The data acquisition unit 202 might also seek out information about the particular user's playing history from previous sessions. For example, a user's past actions in playing videos may be recorded and accessible to the video player software application. This could include the types of videos the user has played in the past, the time of day that the user played videos in the past and the publishers of the videos the user played in the past and well as various other items of information. To the extent the video player software application 200 is able to identify a particular user, the data acquisition unit 202 may be able to obtain the user's past video play actions.

The data acquisition unit 202 may also obtain information that is indicative of a user's degree of engagement with one or more videos that have previously been played to the user by the same instantiation of the video player software application 200, such as the number of seconds of a previously played video that the user watched and/or whether the user watched a previously played video to substantial completion.

The information that is obtained or collected can include whether and to what degree the instantiation of the video player software application is viewable to a user at the time the user requests play of the video now loaded in the instantiation of the video player software application. This information can also include information indicative of how playback of a video is triggered by the user. This information could also include how many videos the instantiation of the video player software application has played for the user.

Other information that can be indicative of viewability include the hosting type, the edition of the video player software application, the type of device on which the video player software application is running and whether and how many other instantiations of video players are also present on the webpage where the video player software application is instantiated. The information can include information about the web browser that is being used, the country in which the user is located, the operating system being used and information about the available bandwidth.

With respect to previously played videos and video advertisements, the obtained or collected information can include the number of video advertisements that were visible during previous plays, how much of the video advertisements the user watched, the duration of previous plays, the fraction of a previously played video that the user watched and whether previous videos were watched to substantial completion. Other information could include whether the user selected a previously played video advertisement to obtain more information about the advertised product or service, whether the user skipped a previously played video advertisement, when possible.

A viewability score generation unit 203 uses information collected by the data acquisition unit 202 to generate a viewability score. The viewability score represents a prediction or confidence that a video advertisement played by the instantiation of the video player software application will be visible on the user's display screen. The viewability score is generated before or at the time a bid request unit 204 of the instantiation of the video player software application sends a bid request for playing a video advertisement. Thus, the viewability score is a prediction about what will occur in the future when a video advertisement is played for the user. The higher the viewability score, the greater the chances that the video player will be located on a portion of the webpage that is visible on the user's display screen when a video advertisement is played.

A viewability score may be qualified in various ways. For example, the viewability score may provide a prediction that at least X number of continuous seconds of a video advertisement will be visible on the user's display screen when a video advertisement plays. Thus, the viewability score may not provide a prediction that the video player software application will be viewable to the user for the entire duration of the advertisement, but rather that it will be visible to the user for at least a predetermined period of time while the video advertisement plays.

Similarly, the viewability score may provide a prediction that at least X % of the video player software application will be visible on the user's display screen when a video advertisement plays. For example, the viewability score may be a prediction that at least 50% of the video player will be visible on the user's display screen when a video advertisement plays.

In other instances, a viewability score may be a prediction that all or a portion of the video player software application will be viewable to the user for the entire duration of a video advertisement.

The example qualifications explained above may be combined such that a viewability score comprises a prediction that when a video advertisement plays, at least 50% of the advertisement will be visible for at least 2 continuous seconds of the advertisement. Of course, these are just two examples of how a viewability score could be qualified. Other types of qualifications may able be part of a viewability score, and the viewability score may be limited by various other combinations of qualifications.

The video player software application 200 also includes a bid request unit 204, and a bid analysis unit 206. The bid request unit 204 and the bid analysis unit 206 are used to obtain bids for playing video advertisements from a partner advertising provider or from a traditional advertising service, as will be explained in greater detail below. Essentially, the bid request unit 204 will send a request for a bid for playing a video advertisement to one or more partner advertising providers, or to an advertising service.

As will be explained in greater detail below, various items of information relevant to the video player software application 200 may be included in a bid request to help advertisers decide whether to submit a bid to play a video advertisement, and if so, how much to bid. For example, the viewability score generated by the viewability score generation unit 203 can be included in a bid request sent to an advertiser. The information included with a bid request might also include information about a video that will be played in connection with the video advertisement, the size of the video player, its volume level, the current language setting, as well as other details.

The bid analysis unit 206 receives bids from one or more partner advertising providers or from an advertising service, and it decides whether to accept one of the bids. If the bid analysis unit 206 decides to accept a bid from a partner advertising provider, the player unit 208 of the video player software application will then play a video advertisement provided by or identified in the winning bid.

The video player software application 200 can also include a video queue 210, which is a list of videos that will be played after the currently loaded video. In addition, a settings module 212 can hold the current settings of the instantiation of the video player, such as volume, resolution, language, and various other settings.

The depiction of a video player software application 200 provided in FIG. 2 should in no way be considered limiting. A particular instantiation of a video player software application 200 could include many other elements in addition to those shown in FIG. 2. Conversely, a particular instantiation of a video player software application 200 may not include all the elements illustrated in FIG. 2.

Figure 3:
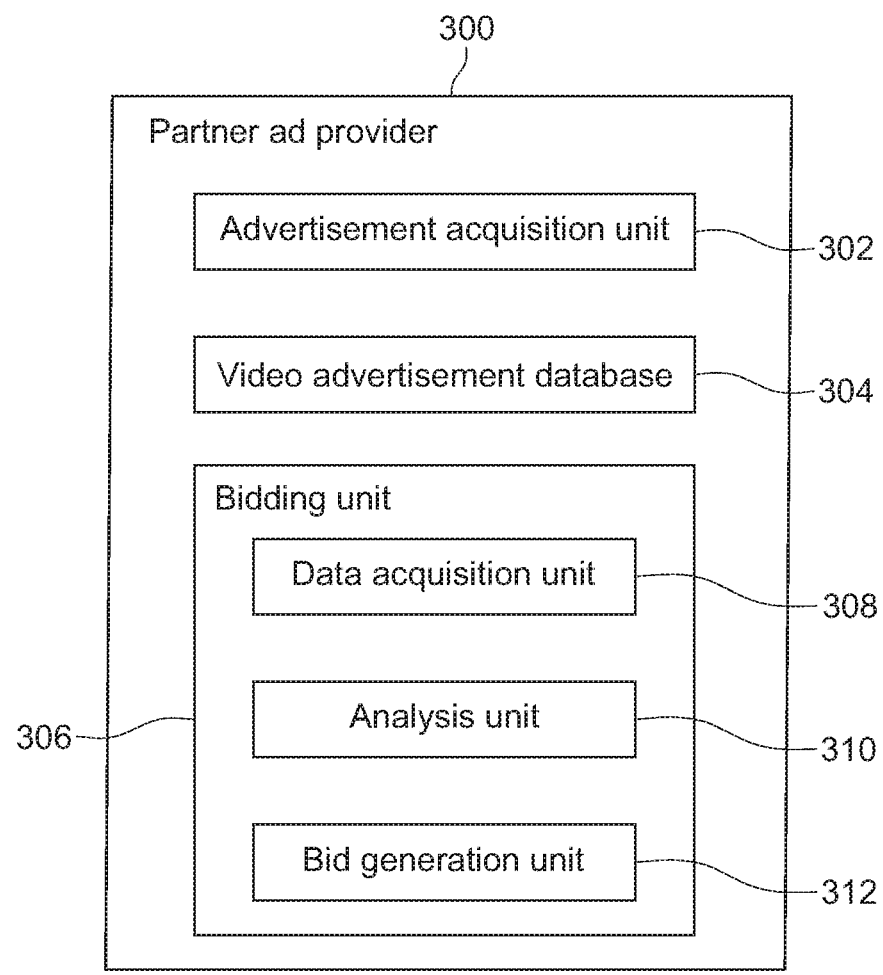
FIG. 3 is a diagram of various elements of a partner and provider.

FIG. 3 illustrates various elements of a partner advertising provider 300. As will be explained in greater detail below, a partner advertising provider 300 can work in concert with a video player software application 200 embodying the invention to quickly obtain video advertisements relevant to a video loaded into the video player software application 200.

The partner advertising provider 300 includes an advertising acquisition unit 302 that obtains various video advertisements from various advertising parties. Information about available video advertisements can be stored in a video advertisement database 304. In some instances, the video advertisements themselves could be stored as part of the video advertisement database 304. In other instances, the video advertisement database may comprise the titles of advertisements, information about the advertisements, and information about how the advertisements can be obtained, such as URL information.

The partner advertising provider 300 also includes a bidding unit 306. The bidding unit 306 responds to bid requests issued by the bid request unit 204 of video player software application 200, as described in greater detail below.

The bidding unit 306 includes a data acquisition unit 308 that is responsible for acquiring various information that can be used to generate a bid that will be sent back to the video player software application 200. The information could relate to the publisher's website, and also to the instantiation of a video player software application that is making a bid request. The data acquisition unit 308 may acquire some of this information from the bid request sent by the bid request unit 204 of the video player software application 200. The data acquisition unit 308 might also be capable of obtaining various items of relevant information from alternate sources, such as website rating services, as will be explained in greater detail below.

The bidding unit 306 also includes an analysis unit 310 that analyzes information included in a bid request, as well as information that is obtained by the data acquisition unit 308, in order to generate a bid that is sent back to a video player software application. In addition, the bidding unit 306 includes a bid generation unit 312 that generates the actual bid that is sent back to a video player software application 200. Typically, the bid will include a price that the partner advertising provider is willing to pay to have a certain video advertisement played to the webpage viewer. The bid may also include information that will enable the video player software application to obtain and play the video advertisement selected by the partner advertising provider 300.

Figure 4:
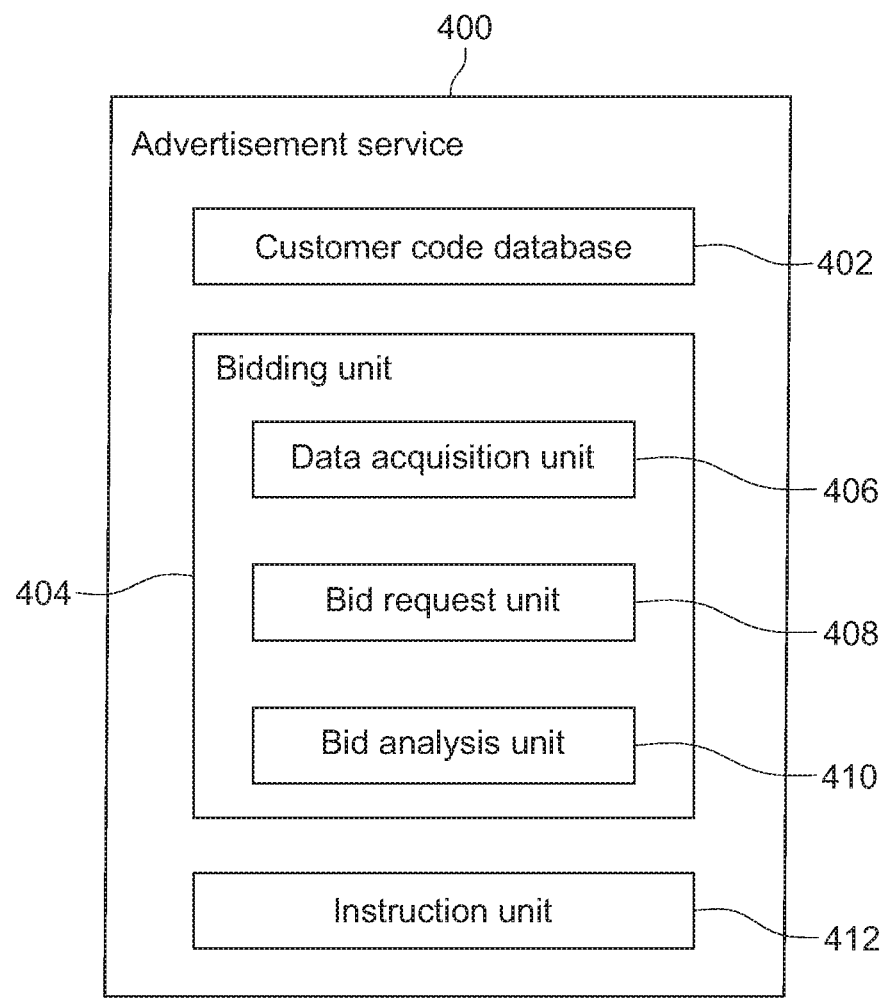
FIG. 4 is a diagram of various elements of an advertising service.

FIG. 4 illustrates various elements of a more traditional advertising service 400 that a website publisher can utilize to obtain advertisements that are displayed on the website publisher's website. The advertising service 400 could offer display or banner ads, as well as video advertisements to a website publisher.

The advertising service 400 includes a customer code database 402, which can include individual items of computer code that have been custom created for each of the advertising service's clients. The computer code created for a particular website publisher is sometimes referred to as an "ad tag". The custom code created for each website publisher could take into consideration various factors including the type of content that the website publisher typically places on its websites.

The advertising service 400 also includes a bidding unit 404. In the case of an advertising service 400, the bidding unit 404 sends bid requests out to various advertisers to request their bids for placing an advertisement on a website publisher's website. Thus, the bidding unit 404 is not providing a bid back to the video player software application, as would a partner advertising provider 300. Instead, the bidding unit 404 is sending bid requests to advertisers, and then receiving and evaluating the advertiser's bids.

The bidding unit 404 includes a data acquisition unit 406 that is responsible for obtaining various items of information that are needed to send bid requests to advertisers, and also to evaluate bids provided by those advertisers. The bidding unit 404 also includes a bid request unit 408 that sends bid requests out to various advertisers, as will be described in greater detail below. Finally, the bidding unit 404 includes a bid analysis unit 410 that analyzes bids provided by advertisers to determine which advertiser's bid to accept.

The advertising service 400 further includes an instruction unit 412, which sends information back to either a web browser that is rendering a webpage, or to a video player software application instantiated on a webpage. The information enables the browser or video player to obtain and display/play the advertisement selected by the bid analysis unit 410

Figure 5:
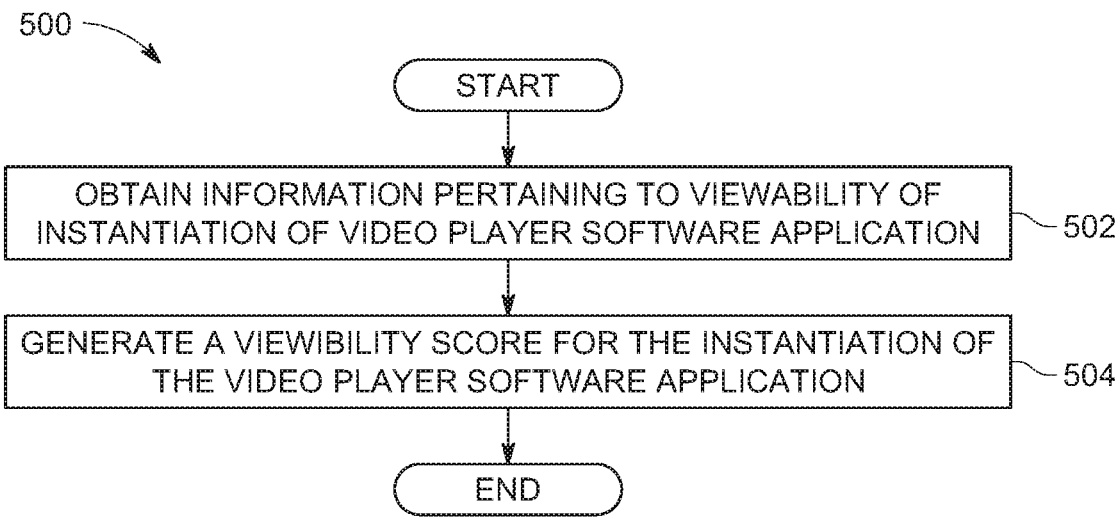
FIG. 5 is a flow diagram illustrating steps of a method of generating a viewability score for an instantiation of a video player software application.

FIG. 5 illustrates steps of a method that would be performed by elements of an instantiation of a video player software application to generate a viewability score for the instantiation of the video player software application. The instantiation of the video player software application would be part a webpage rendered by a web browser software application on a user computing device. Typically, when the instantiation of the video player software application is first initialized, various settings would be established, and a video would be loaded for play. However, unless auto-play has been enabled, the instantiation of the video player software application would not begin to play the video until the user issues a play command.

The method 500 depicted in FIG. 5 involves the instantiation of the video player software application generating a viewability score. As explained above, the viewability score for the instantiation of the video player software application indicates of a degree of confidence that the instantiation of the video player software application will be located on a portion of the webpage that currently appears on the user's display screen at the time that a video advertisement begins to play. Once generated, the viewability score can be included in bid requests sent to video ad providers to help the video ad providers generate a bid for having a video advertisement played by the instantiation of the video software application.

The method 500 begins and proceeds to step 502, where a data acquisition unit 202 of the instantiation of the video player software application obtains information pertaining to the viewability of the instantiation of the video player software application. The types of information that can be collected in step 502 are discussed in detail above in connection with the discussion of the data acquisition unit 202 depicted in FIG. 2. This information can include whether the instantiation of the video player software application is currently visible on the user's display screen. The information obtained in step 502 may also relate to the current condition and settings of the video player software application and the current condition and settings of the user's computing device and other software applications thereon, such as a web browser and operating system. The information obtained in step 502 can also relate to user performed actions that occurred in the recent past, such as in connection with the play of previous videos. The information obtained in step 502 could also relate to the degree of user engagement with a video that was previously played for the user by the instantiation of the video player software application. The degree of user engagement could be reflected by the number of seconds of the video that the user watched and whether the user watched the video to substantial completion.

The method then proceeds to step 504 where a viewability score generation unit 203 uses the information obtained in step 502 to generate a viewability score for the instantiation of the video player software application. The information that is obtained in step 502 can be combined in various different ways to generate the viewability score. Some items of information may be given different degrees of importance than other items of information in generating the viewability score. Also, various different mathematical operations may be performed on individual items of obtained information before combining the transformed information with other items of information. The end result, however, is a viewability score that indicates a degree of confidence that the instantiation of the video player software application will be viewable on the user's display screen when a video advertisement later begins playing. The method 500 then ends.

Figure 6:
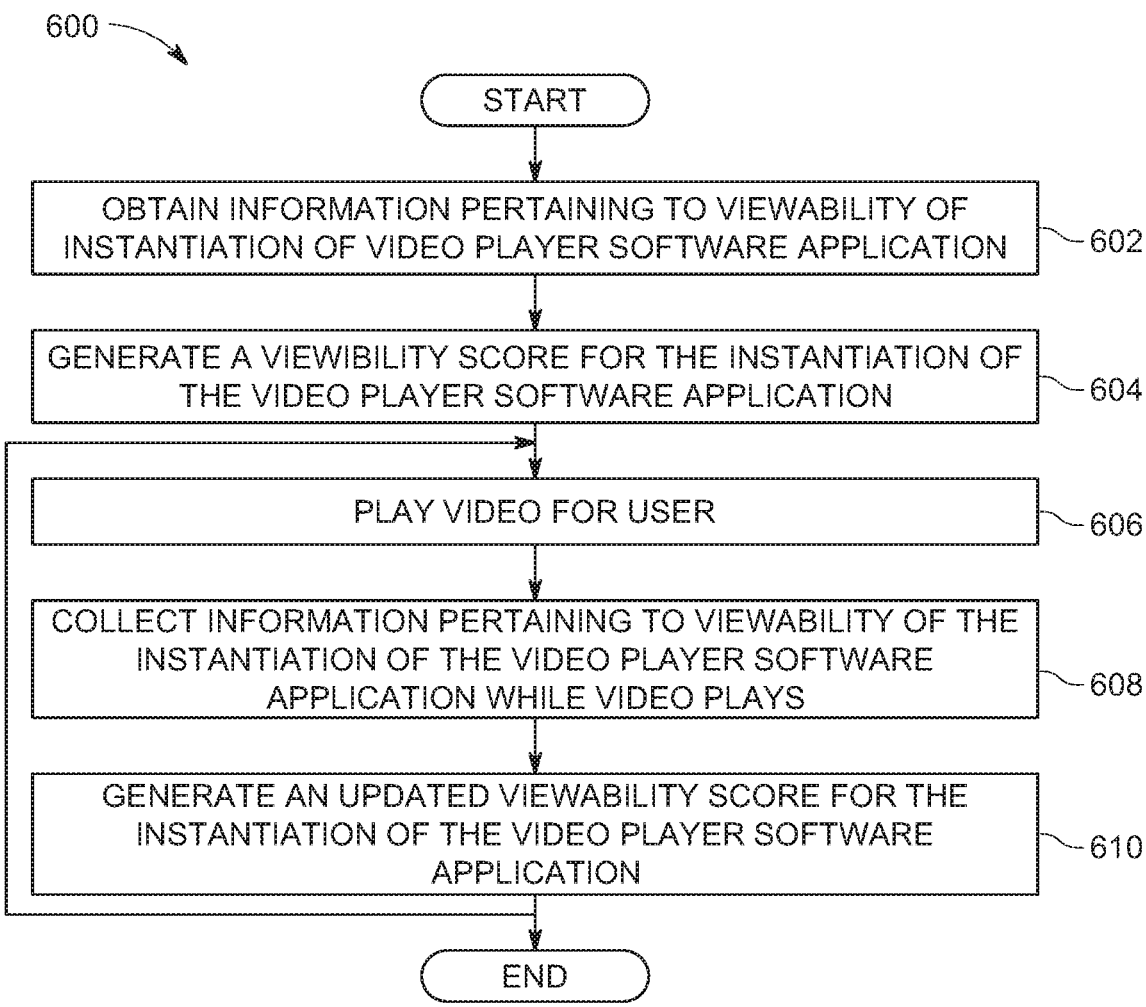
FIG. 6 is a flow diagram illustrating steps of another method of generating and later updating a viewability score for an instantiation of a video player software application.

As mentioned above, when an instantiation of a video player software application is first generated for a webpage, various information pertaining to the viewability of the instantiation of the video player software application can be obtained and used to generate an initial viewability score for the instantiation of the video player software application. Thereafter, when the instantiation of the video player software application plays a video for a user, information relating to play of the video can be obtained and used to generate an updated or revised viewability score for the instantiation of the video player software application. Indeed, each time that the instantiation of the video player software application plays a new video for the user, additional information pertaining to play of the new video can be taken into account in generating an updated or revised viewability score. FIG. 6 depicts such a method.

The method 600 illustrated in FIG. 6 begins and proceeds to step 602 where information pertaining to the viewability of a new instantiation of a video player software application is obtained by a data acquisition unit 202 of the instantiation of the video player software application. The obtained information can include information about whether the instantiation of the video player software application is presently viewable on the user's display screen, information about the settings of the video player, as well as various other items of information.

In step 604, based on the information obtained in step 602, a viewability score generation unit 203 of the instantiation of the video player software application generates an initial viewability score for the instantiation of the video player software application. The viewability score could be generated as soon as the video player software application is instantiated. Alternatively, or in addition, the initial viewability score could be generated just before a bid request is sent to video advertisers, a video advertisement service or a partner ad provider.

Next, in step 606, a player unit 208 of the instantiation of the video player software application plays at least one video for the user. This could involve playing a single video that the user has requested be played. In some instances, this could involve playing a first video advertisement obtained from a video advertiser, and then playing a second video with content that the user wishes to see. In some instances, multiple video advertisements may be played in connection with a desired video, where one video advertisement is played before the desired video plays, and where the desired video is halted one or more times to play additional video advertisements.

In step 608, as one or more videos are played by the player unit 208 of the instantiation of the video player software application, information pertaining to the viewability of the instantiation of the video player software application is collected by the data acquisition unit 202. The information collected by the data acquisition unit 202 could include any of the items of information discussed above.

In step 610, the viewability score generation unit 203 generates an updated viewability score for the instantiation of the video player software application using the information obtained in step 602 and the information that was collected in step 608 as the one or more videos were played for the user. The updated viewability score could be generated as soon as play of a previous video ends. Alternatively, the updated viewability score could be generated just before a new bid request is sent to one or more video advertisement providers. Provided the instantiation of the video player software application plays additional videos for the user, steps 606-610 would be repeated to update the viewability score for the instantiation of the video player software application. The method would end when the user either closes the webpage upon which the instantiation of the video player software application resides, or because the user closes the browser software application itself.

The updated viewability score that is generated by the viewability score generation unit 203 in step 610 would be included in any bid requests that the instantiation of the video player software application sends to a video ad provider. Because a method as depicted in FIG. 6 results in the viewability score for an instantiation of a video player software application being continuously updated based on current actions of the user or current conditions of the webpage, an ad provider is able to generate a bid for playing a video advertisement on the instantiation of the video player software application with greater confidence regarding the viewability of the video player software application.

Figure 7:
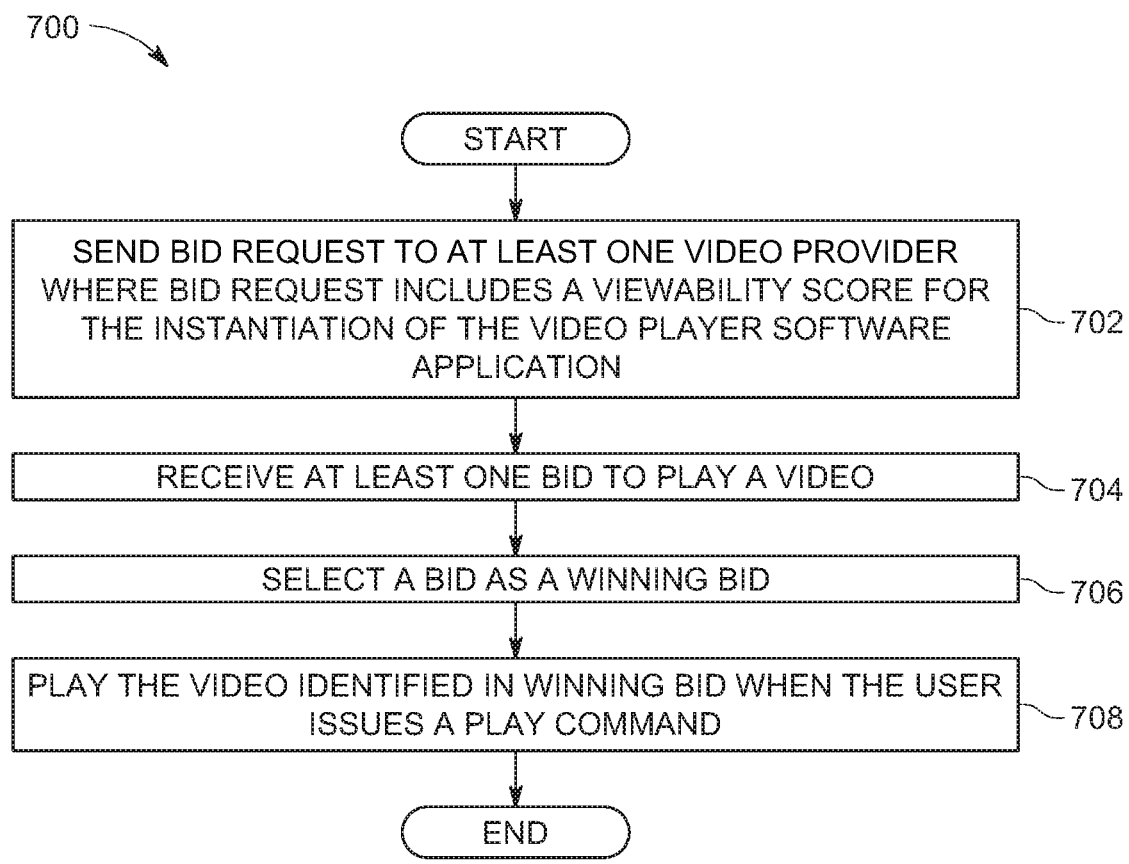
FIG. 7 is a flow diagram illustrating steps of a method of obtaining and playing a video advertisement.

FIG. 7 illustrates a generalized method that would be performed by an instantiation of a video player software application to obtain and play a video advertisement prior to playing an item of video content to a user. The video player software application would be instantiated on a webpage as a browser software application on a user's computing device renders the webpage. Upon instantiation, the video player software application would be loaded with an item of video content that could be played to the user. However, the instantiation of the video player software application would not play the item of video content to the user until the user issues a play command. In a method as illustrated in FIG. 7, the instantiation of the video player software application would obtain a video advertisement that is to be played in conjunction with the loaded item of video content before the user issues the play command. As a result, when the user does issue the play command, the instantiation of the video player software application can immediately begin playing the video advertisement it has obtained. Upon completion of the video advertisement, the instantiation of the video player software application would then play the item of video content originally loaded in the video player software application.

The method 700 begins and proceeds to step 702 where the bid request unit 204 of the instantiation of the video player software application sends a bid request to at least one video ad provider. In some instances, the bid request would be sent to multiple video ad providers. In other instances, the bid request may be sent to only a single video ad provider, such as an advertising service 140. Regardless, the bid request would include a viewability score for the instantiation of the video player software application. The viewability score that is included in the bid request could be generated using methods such as those depicted in FIGS. 5 and 6.

In step 704, a bid from one or more video ad providers would be received back at the instantiation of the video player software application. Each bid would include information indicating a price that the video ad provider is willing to pay to have a video advertisement played to the user by the instantiation of the video software application. Each bid would also include information that would enable the instantiation of the video player software application to obtain and play a video advertisement. In some instances, a bid could also include information about the content of the video advertisement that the video ad provider would like to have played to the user. A bid might also include information identifying the party or company that is advertising a product or service in the video advertisement. The bids could be received by the bid request unit 204 or the bid analysis unit 206 of the instantiation of the video player software application.

Step 706 is an optional step that would be performed only if the instantiation of the video player software application sent the bid request to multiple video ad providers in step 702 and then received back multiple bids from the video ad providers in step 704. If that is the case, and multiple bids have been received, then in optional step 706 the bid analysis unit 206 selects one of the multiple bids as a winning bid. In some embodiments, the bid analysis unit 206 could simply select the highest bid as the winning bid. In other instances, additional factors could come into play when selecting a winning bid.

For example, the bid analysis unit 206 might also take into account the content of the video ads identified in the bids. In a particular instantiation of a video player software application, the bid analysis unit 206 may be configured to refuse bids that involve playing certain types of content. Similarly, an instantiation of a video player software application may be configured to refuse to accept bids that involve playing a video advertisement for certain parties or companies. A bid analysis unit 206 might also be configured to prioritize the acceptance of certain video advertisements over others, despite a lower bid price, based on the content of the video advertisements or based on the identity of the party or company that is advertising a product or service.

In step 708, the player unit 208 of the instantiation of the video player software application plays the video advertisement identified in the winning bid when the user issues a play command. Thereafter, the player unit would play the item of video content that was originally loaded in the video player software application.

Figure 8:
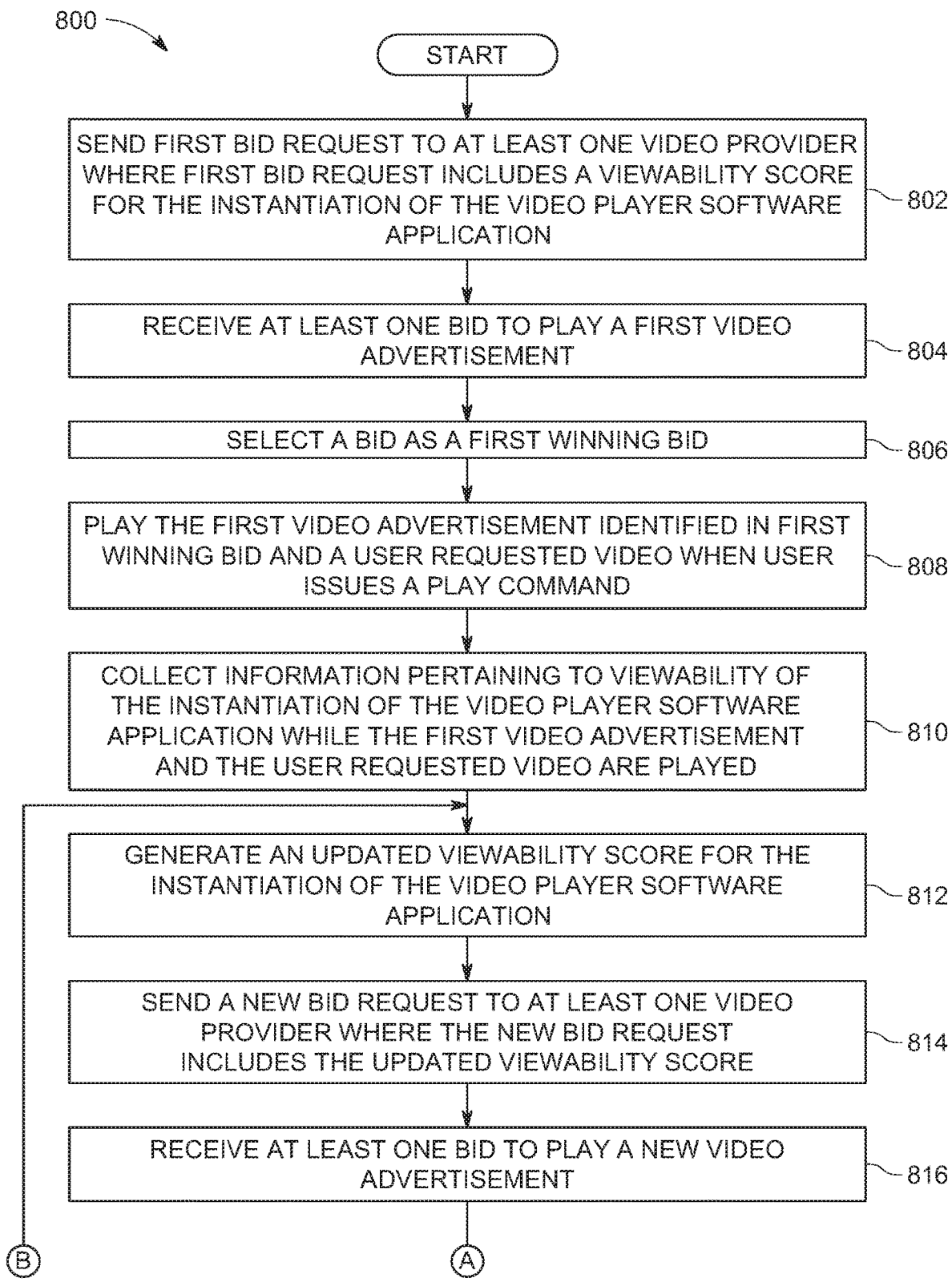
FIG. 8 is a flow diagram illustrating steps of a method of obtaining and playing multiple videos for a user where a viewability score is generated and updated during play of the videos.
Figure 8:
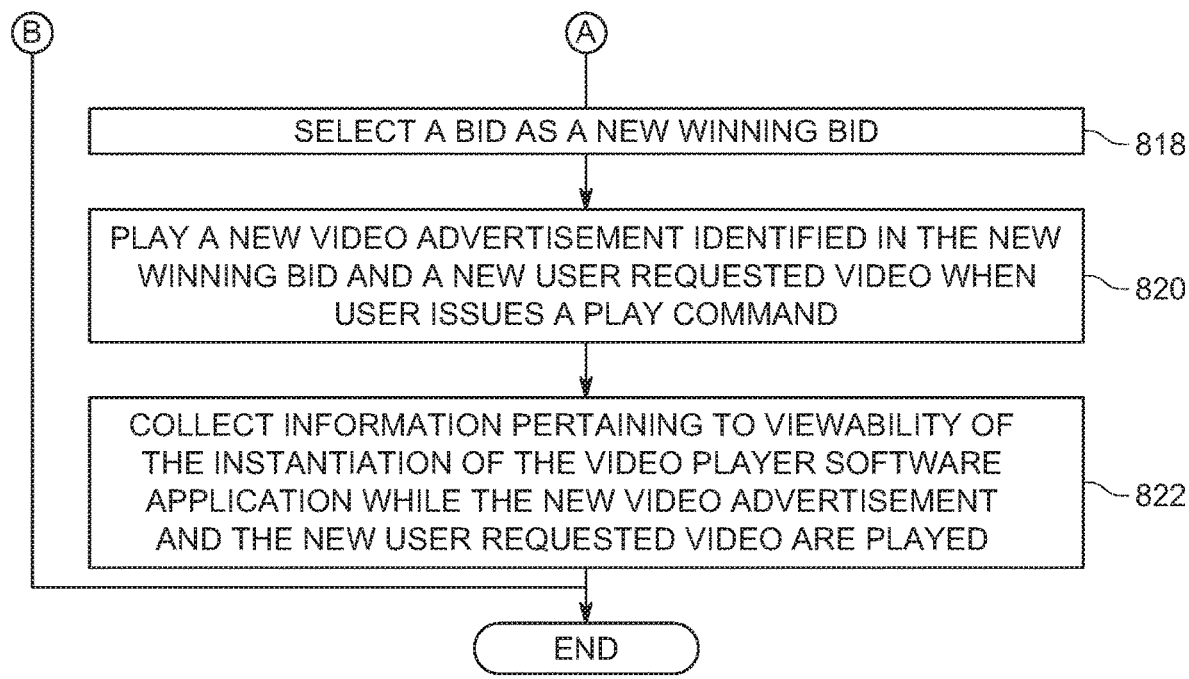

A method as illustrated in FIG. 7 could be performed when a video player is first instantiated on a webpage and before the instantiation of the video player software application has played any videos to the user. However, as explained above in connection with FIG. 6, once the instantiation of the video player software application begins to play videos to the user, information can be collected and used to generate an updated viewability score for the instantiation of the video player software application. Thus, the viewability score that is included in a first bid request sent to video ad providers may be different than the viewability score that is included with subsequent bid requests. FIG. 8 illustrates a method in which an instantiation of a video player software application continuously updates its viewability score as videos are played for the user.

The method depicted in FIG. 8 involves a situation where an instantiation of a video player software application is loaded with a video that a user may wish to view, and where the video player software application is configured to play a video advertisement for the user before the desired video is played for the user. Typically, the instantiation of the video player software application will display a screenshot or some other image that relates the video that has been loaded in the video player software application. A title and other descriptive information may also be provided to inform the user about the video loaded in the video player software application. Also, it may be possible for the user to cause the video player software application to play a preview of the video by taking some action, such as placing a cursor or selection icon over the video player software application.

When the user ultimately issues a play command to view the video loaded in the instantiation of the video player software application, the video player software application will first play a video advertisement for the user. If the user allows the video advertisement to play to completion, then as soon as the video advertisement ends the video that was originally loaded in the video player software application is played. In some instances, a user may be given the opportunity to halt play of the video advertisement after a predetermined number of seconds of the video advertisement has played by selecting an icon. If the user takes that action after the predetermined number of seconds of the video advertisement has played, the video player software application will halt the video advertisement and switch to playback of the video originally loaded in the instantiation of the video player software application.

Returning to FIG. 8, the method 800 begins and proceeds to step 802 wherein a bid request unit 204 of the instantiation of a video player software application which has been initialized on a webpage sends a first bid request to at least one video provider. The at least one video provider could be a service which provides video advertisements, actual advertisers or a partner ad provider, as will be discussed in greater detail below. The instantiation of the video player software application will have already loaded an initial video which can be played to a user. In some embodiments, before the user issues a play command to request playback of the loaded video, the instantiation of the video player software application obtains a bid to play a video advertisement prior to playback of the loaded video. In other embodiments, the instantiation of the video player software application does not send out a bid request until the user issues a play command.

The bid request which is sent to at least one video ad provider will include a viewability score for the instantiation of the video player software application. The bid request may include various other items of information, such as a title of the video which has been loaded into the video player software application, as well as other information about that video. The bid request may also include information about the instantiation of the video player software application, such as a language setting, a volume setting, or information about the location of the video player software application on the rendered webpage.

In step 804, bid analysis unit 206 of the instantiation of the video player software application receives at least one bid to play a first video advertisement to the user. Each received bid will likely include a price that the video ad provider is willing to pay to have that video advertisement played to the user.

In step 806, the bid analysis unit 206 of the instantiation of the video player software application selects one of the received bids as a first winning bid. The winning bid can be selected based on the price which will be paid for playing the video advertisements identified in each of the submitted bids. However, additional information about the video advertisement may also be used by the bid analysis unit 206 to select a winning bid. For example, the bid analysis unit 206 may take into account the content of the video advertisement or contractual obligations in selecting one of the submitted bids as the winning bid.

In step 808, the player unit 208 of the instantiation of the video player software application will play the first video advertisement identified in the first winning bid, and thereafter play the video that was originally loaded in the instantiation of the video player software application. As noted above, it may be possible for the user to skip a portion of the first video advertisement after predetermined number of seconds of the first video advertisement have been played. In step 810, which is performed substantially simultaneously with step 808, information is collected as the video advertisement and the first user requested video are played to the user. The collected information pertains to the viewability of the instantiation of the video player software application. The information collected in step 810 can include information collected after play of the first advertisement and after play of the user requested video.

Next, in step 812, the viewability score generation unit 203 of the instantiation of the video player software application generates an updated viewability score for the instantiation of the video player software application based upon the information collected in step 810. The updated viewability score could be generated immediately after play of the first video advertisement and the user requested video. Alternatively, the updated viewability score could be generated just before a new bid request is generated and sent to one or more video ad providers.

Once the user requested video has been fully played, or cases where the user deliberately halts playback of the first video, the instantiation of the video player software application may take steps to load a new video. The new video may be selected from a video queue 210 of the instantiation of the video player software application. Once the new video is loaded, in step 814 the bid request unit 204 of the instantiation of the video player software application sends a new bid request to at least one video provider, where the new bid request includes the updated viewability score and possibly information about the new video. In some embodiments, the new bid request is sent immediately after the new video is loaded, without the need for the user to issue a play command. In other embodiments, the new bid request is not sent until the user issues a play command.

In step 816, the bid analysis unit 206 of the instantiation of the video player software application receives at least one bid to play a new video advertisement from one or more of the video ad providers. In step 818, bid analysis unit 206 selects one of the received bids to play a new video advertisement as a new winning bid. Here again, considerations other than simply the price that will be paid to play the new video advertisement may be considered in selecting the winning new bid.

In step 820, the player unit 208 of the video player software application then plays the new video advertisement identified in the new winning bid, and thereafter plays the new user requested video. In some instances, the video player software application may be configured for autoplay of subsequent videos. In that instance, would not be necessary for the user to issue a play command in order for the player unit 208 to play the new video advertisement and the new user requested video. Instead, playback of the new video advertisement and the new user requested video may proceed as soon as the first user requested video has finished. In other instances, it would be necessary for the user to issue a play command before play of the new video advertisement and the new user requested video begins.

In step 822, which may be performed simultaneously with step 820, information pertaining to the viewability of the instantiation of the video player software application is collected while the new video advertisement and the new user requested video are played. The information collected in step 822 can include information collected after play of the new advertisement and after play of the new user requested video.

The method then loops back to step 812 where the viewability score generation unit 203 of the instantiation of the video player software application generates an updated viewability score based on the information collected in step 822. Steps 812-822 may be continuously repeated until the user navigates to a new webpage, or the user's web browser is closed. At that point, the method would end.

Figure 9:
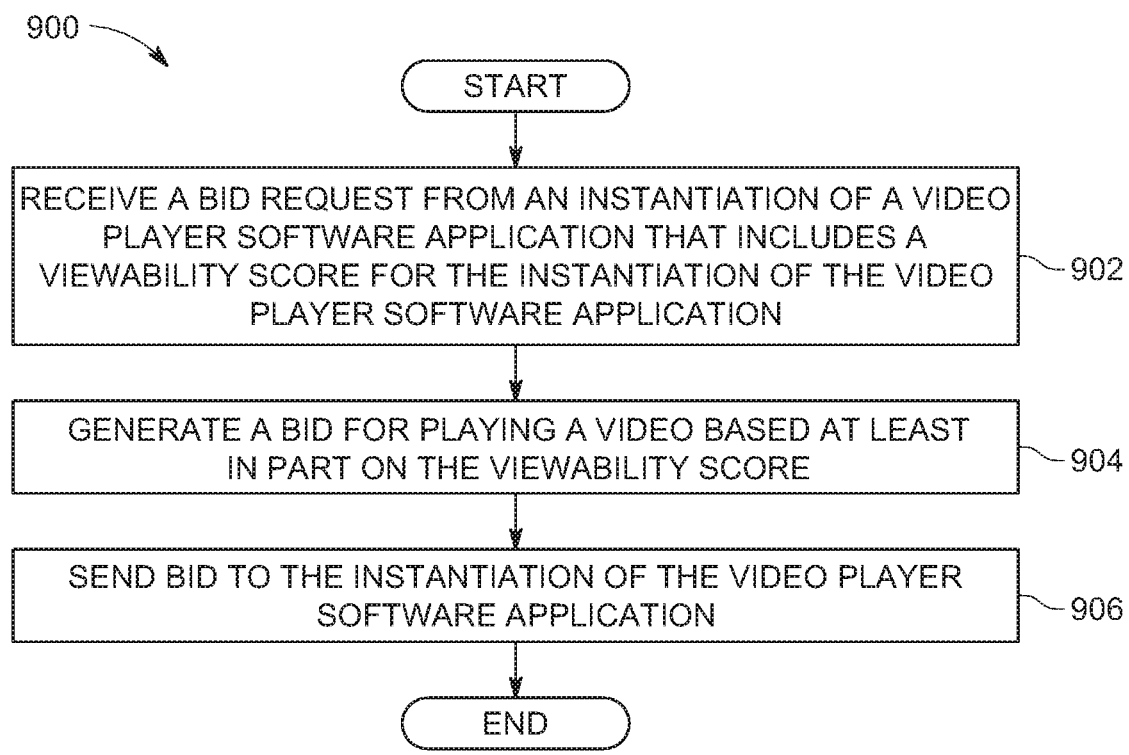
FIG. 9 is a flow diagram illustrating steps of a method of responding to a bid request.

The method discussed above in connection with FIG. 8 would be performed by elements of an instantiation of a video player software application loaded on a user's computing device. FIG. 9 illustrates steps of a method that would be performed by a video ad provider to respond to a bid request sent from a bid request unit 204 of a video player software application.

The method 900 begins and proceeds to step 902 where a video ad provider would receive a bid request from an instantiation of a video player software application. Such a bid request would be received from a bid request unit 204 of the video player software application. The bid request would include at least a viewability score for the instantiation of the video player software application. When the video ad provider is an advertisement service 400 as illustrated in FIG. 4, the bid would be received by a bidding unit 404. If the video ad provider is a partner ad provider 300, as illustrated in FIG. 3, the bid would be received by a bidding unit 306.

As noted above, other information may also be included in the bid request to help the video ad provider structure an appropriate bid for playing a video advertisement. The additional information could include information about the video that will be played in connection with the video advertisement, as well as information about the instantiation of the video player software application. If available, the information included with the bid request may also include information about the user to whom a video advertisement would be played.

In step 904, the video ad provider would generate a bid for playing a video advertisement. The bid would be based, at least in part, on the viewability score for the instantiation of the video player software application that was included in the bid request. The bid would be generated by a bid generation unit 312 of a partner ad provider 300 or by the bidding unit 404 of an advertisement service 400.

Finally, in step 906, the video ad provider would send the bid to the instantiation of the video player software application. The bid sent to the instantiation of the video player software application would include a price that the video ad provider is willing to pay to have a video advertisement played to the user. The bid would also include information which allows the instantiation of the video player software application to obtain and play the video advertisement. The bid would be sent to the instantiation of the video player software application by a bidding unit 306 of a video ad provider 300 or by a bidding unit 404 of an advertising service 400. The method then ends.

The way that an instantiation of a video player software application obtains a bid to play an advertisement can vary significantly. In some instances, the instantiation of the video player software application may send out bid requests to a video advertising service. The video advertising service could then contact multiple video ad providers and obtain bids for playing various different video advertisements from each of the video ad providers. The video advertising service could then select a winning bid and notify the instantiation of the video player software application of which video advertisement is to be played. Thus, in this context, a separate video advertising service is responsible for obtaining bids from multiple video ad providers and selecting the winning bid.

In other situations, the instantiation of the video player software application may itself send out bid requests to multiple video ad providers, receive back bids for playing advertisements for one or more of the contacted video ad providers, and then select one of the bids as the winning bid. Such a method is illustrated in FIG. 9.

In other instances, an instantiation of a video player software application may work in connection with a partner ad provider to obtain a bid for playing a video advertisement. In this instance, rather than sending multiple bids out to a variety of different video ad providers, the instantiation of the video player software application sends out a single bid to a partner ad provider, and the partner ad provider provides a single bid for playing a video advertisement. In many instances, contacting only a single partner ad provider in this fashion can result in a much quicker identification of what video advertisement should be played. One such method is illustrated in FIG. 10.

As mentioned above, FIG. 10 illustrates various steps of a method 1000 that would be performed to cause an instantiation of a video player software application on a webpage to play a video advertisement in conjunction with actual video content. For purposes of the following description, we will refer to a first video and a second video. In this context, the second video is the video content loaded into a video player software application that a user actually wishes to see. The first video would be a video advertisement that will be played to the user before the second video begins to play.

In a typical example, when a webpage is rendered by a browser 104 on a user's computer device 100, a video player software application 200 is instantiated and rendered along with the other elements of the webpage. A particular video is typically loaded in the instantiation of the video player software application 200. The video loaded in the video player software application 200 may have been selected by the publisher of the website because the publisher believes that users would like to view the video. Alternatively, the website publisher may rely upon recommendations from a third party to decide which video to load in the video player software instantiation. Often, a still image relating to the video is displayed within the video player on the webpage, and the still image could include a title or some descriptive material indicating what the video will include.

Figure 10:
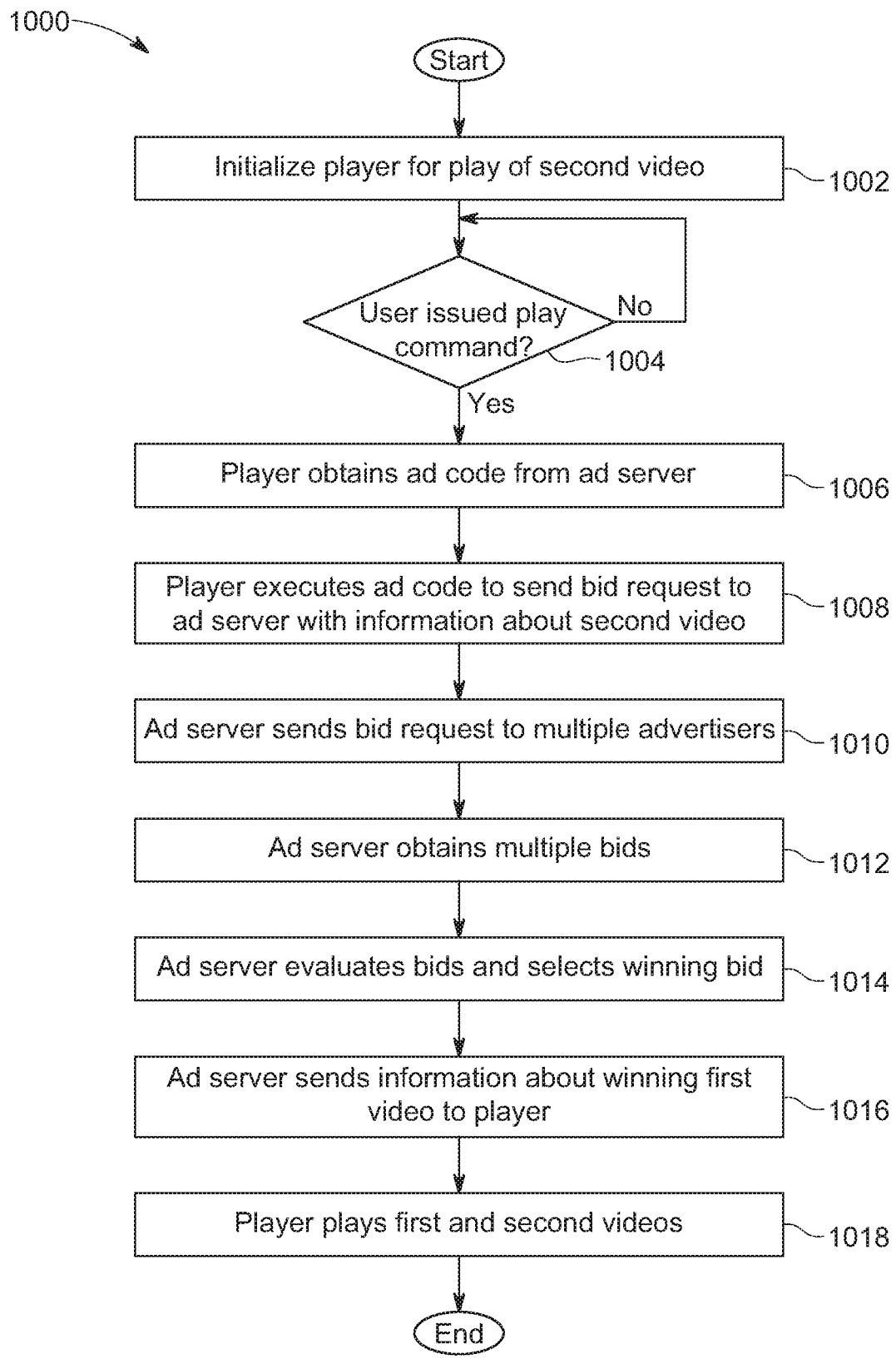
FIG. 10 is a flowchart illustrating steps of a known method for obtaining and playing video content.

The method 1000 illustrated in FIG. 10 starts and proceeds to step 1002 where the video player software application 200 is initialized. Initialization of the video player can include loading a video such that a still image relating to the video is displayed within the video player software application on the webpage. In addition, various initial settings for the video player software application may also be established at this time. After initialization has been completed, the video will be ready to play. However, in most web browsers autoplay of videos is prevented. Instead, a user must take some positive action to cause the video to begin playing. The positive action can include, for example, clicking on a play button within the video player software application on the webpage.

Note, according to the first video/second video naming convention explained above, the video player is first configured to play the "second video," which is the video content the user originally intended to see. When the video player is first instantiated, the video player does not know what video advertisement, the "first video," will be played in conjunction with the second video.

After initialization has been performed in step 1002, a check is made in step 1004 to determine if the user has yet issued a play command. If not, the process loops back and step 1004 is repeatedly performed until the player issues a play command. Once the player has issued the play command, the method proceeds to step 1006 where the video player software application begins the process of obtaining a video advertisement which will be played to the user before the second video.

To obtain the first video from an advertising service 400, the video player software application 200 sends a request to the advertising service 400 seeking the website publisher's "ad tag" from the customer code database 402 of the advertising service 400. As noted above, the ad tag is a piece of custom computer software code that can be executed by the video player software application to help obtain video advertisements from the advertising service 400. The advertising service 400 will look up the correct ad tag for the website publisher and return it to the video player software application 200.

In step 1008, the video player software application 200 executes the ad tag computer code obtained from the advertising service 400 and generates a bid request which is then sent to the bidding unit 404 of the advertising service 400. The bid request can include information about the second video, which is loaded in the video player software application 200, as well as other items of information about the video player software application 200, such as its placement on the webpage, a viewability score that is indicative of whether the video player software is likely to be visible to the user, the size of the video player software application, the resolution of the second video, and perhaps other information about the webpage.

In step 1010 a bid request unit 408 of the bidding unit 404 of the advertising service 400 utilizes information received from the video player software application 200 to create a bid request that is then sent to multiple advertisers. The bid request invites advertisers to bid on the placement of a video advertisement on the webpage.

In step 1012, the bidding analysis unit 410 of the advertising service 400 receives multiple bids from various advertisers. Each bid will include a price that an advertiser is willing to pay to place a video advertisement on the webpage, as well as information identifying the advertisement. The bids returned by the advertisers can also include information about the video advertisement that they propose to have played on the webpage. Each bid also can include information which can later be used by the video player software application to obtain and play the advertiser's video advertisement. For example, each bid can include a URL at which the video advertisement can be obtained.

In step 1014, the bid analysis unit 410 evaluates the various bids provided by the advertisers and selects one of them as the winning bid. In step 1016 the instruction unit 412 of the advertising service 400, then instructs the video player software application 200 as to which video advertisement to play as the first video, before the second video is played. Here again, a URL at which the video advertisement can be obtained could be the information provided by the instruction unit 412 back to the video player software application 200.

Finally, in step 1018, the player unit 208 of the video player software application 200 plays the video advertisement as a first video, and thereafter plays the second video which the user asked to see. The method then ends.

The process described above in connection with FIG. 10 is a typical way that a video advertisement is selected and then played to a user. It requires that multiple individual communications occur and that various bids provided by advertisers be analyzed in order to select a winning bid. Note, all the activity that occurs in order to select a video advertisement occurs only after the user has issued a play command, such as selecting the play button on the displayed video player software application 200. Because all these actions occur after the player has issued a play command, there can be a significant time delay between when the user pushes the play command, and when the first video (the video advertisement) begins to play. If this delay becomes pronounced, it leads to user dissatisfaction. Indeed, if the delay becomes too long, often a user will give up and switch to a different video.

Another aspect of this process is that the advertising service 400 is ultimately selecting the video advertisement that will be played. The video player software application itself simply asks the advertising service 400 to provide a video advertisement, and then plays whatever video advertisement is specified by the advertising service 400. As a result, the publisher of the website is unable to exert much control as to the advertisement that will be played or the price that will be paid for play of the video advertisement.

Figure 11:
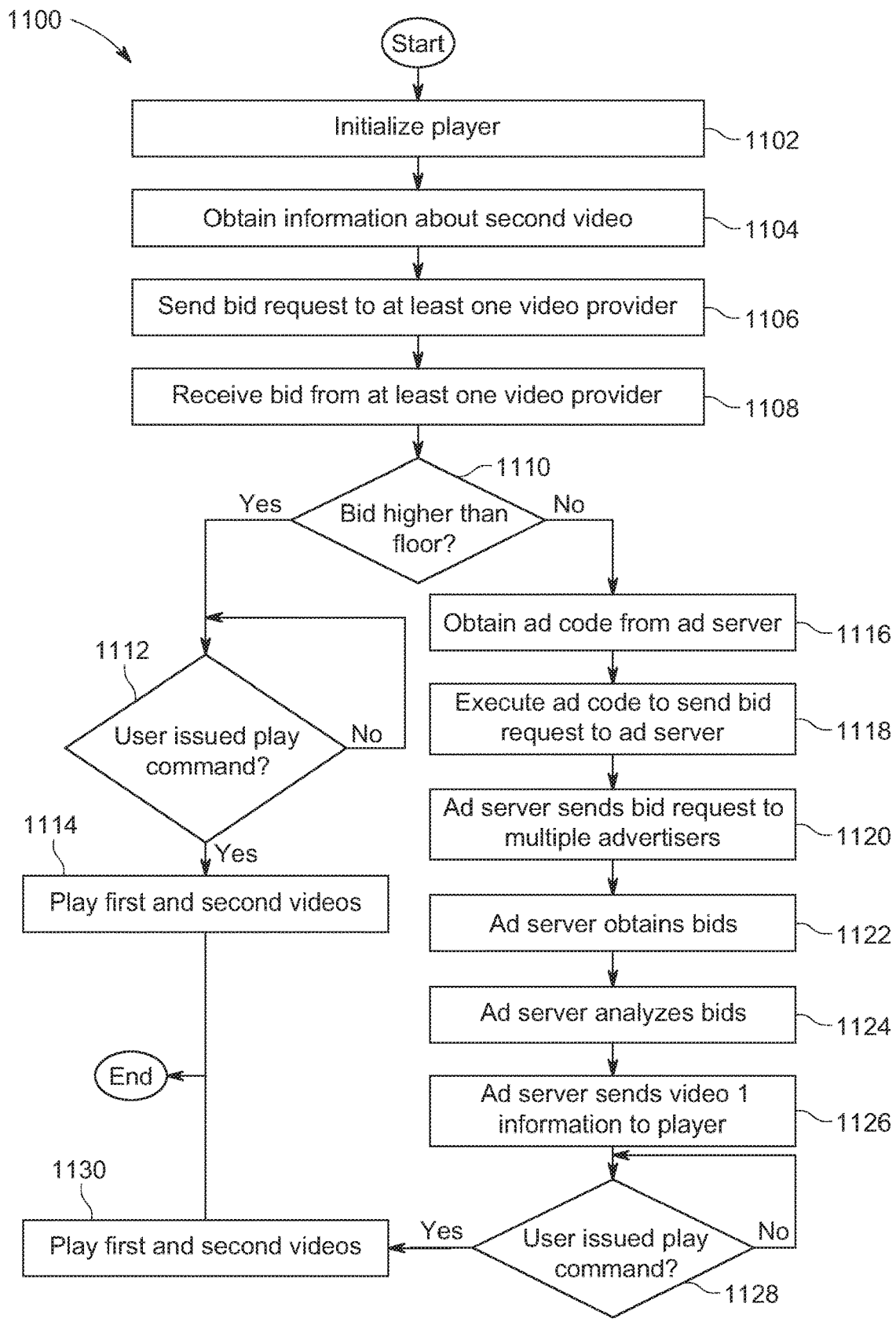
FIG. 11 is a flow diagram illustrating steps of another method for obtaining and playing video content.

FIG. 11 illustrates steps of a method embodying the invention that can be used to more quickly obtain and play a relevant first video advertisement. The method 1100 starts and proceeds to step 1102 where the video player software application 200 is initialized as it is instantiated onto a webpage by a browser on a user's computer. The initialization procedure performed at step 1102 would include loading a second video that will be played to a user if a user issues a play command.

In step 1104, a data acquisition unit 202 of the video player software application initialized in step S602 acquires information about the second video that has been loaded for play. This likely will include the title of the video, and possibly information describing the content of the video, as well as information about settings on the video player itself. This information could also include details about where the instantiation of the video player software application appears on the webpage. For example, whether the video player software application is on a viewable portion of the webpage. The settings information also may include information about the size of the player, volume settings, language settings, and other information. The information could further include a viewability score for the instantiation of the video player software application.

In step 1106 a bid request unit 204 of the video player software application sends a bid request to one or more partner advertising providers 300, as illustrated in FIG. 3. The bid request will include information that the data acquisition unit 202 was able to acquire, including a viewability score, and which could be used by the partner advertising providers 300 to select a first video advertisement for play within the instantiation of the video player software application 200.

At this point, one or more partner advertising providers would receive a bid request from the bid request unit 204 of the video player software application. The partner advertising provider(s) would then select a video advertisement and decide on a bid amount—which is the price the partner advertising provider is willing to pay to have the selected video advertisement played in conjunction with the second video loaded in the video player software application 200. The partner advertising provider(s) then sends a bid to the bid analysis unit 206 of the video player software application 200. The bid can include information that will enable the video player software application to obtain and play the video advertisement selected by the partner advertising provider, such as a URL at which the video advertisement is stored. Note: none of these actions are illustrated within FIG. 11, but these actions would be performed by one or more partner advertising providers as part of this overall method.

In step 1108, the bid analysis unit 206 of the video player software application 200 receives at least one bid for playing a first video advertisement from a bid generation unit 312 of a partner advertising provider 300. If multiple partner advertising providers respond to the bid request sent by the bid request unit 204, the bid analysis unit 206 will receive multiple bids. Each received bid will include the price that a partner advertising provider is willing to pay to have a first video advertisement played to the user. In addition, as noted above, the bid will typically also include information that will enable the video player software application to obtain and play a first video advertisement.

If the bid request unit 204 receives multiple bids from multiple partner advertising providers, the bid analysis unit 206 may select the bid offering the highest price for further analysis. In other instances, other considerations besides or in addition to the bid price may come into play in determining which bid to subject to further analysis. Regardless, at the conclusion of step 1108 a single bid from one partner advertising provider is selected for further analysis.

The method then proceeds to step 1110 where the bid analysis unit 206 compares the price of the selected (or only) bid to a preset floor price. The preset floor price can be set by the website publisher by configuring the settings of the video player software application 200 in the settings module 212. The preset floor price is the minimum price that the website publisher will accept in order to play a first video advertisement to a user.

If the analysis performed in step 1110 indicates that the bid from the partner advertising provider was equal to or higher than the preset floor price, the method proceeds to step 1112 where a check is performed to determine if the user has issued a play command. If not, step 1112 is repeatedly performed until it is determined that the user has issued a play command. When that occurs, the method proceeds to step 1114, where the player unit 208 of the video player software application 200 plays the first video advertisement identified in the winning (or only) bid from a partner advertising provider, and thereafter plays the second video, which was originally loaded into the video player software application during the initialization step at 1102. The method then ends.

If the analysis performed in step 1110 indicates that the bid price provided by a partner advertising provider is lower than the preset floor price, then the traditional procedures for obtaining and playing a first video advertisement are performed, similar to what was described in connection with FIG. 10.

The method would first proceed to step 1116 where the video player software application requests and obtains an ad tag from an advertising service 400. The method would then proceed to step 1118 where the custom code in the ad tag is executed by the video player software application 200 to create a bid request that is then sent to the bidding unit 404 of the advertising service 400.

In step 1120, the bidding unit 404 of the advertising service 400 sends bid requests to multiple advertisers. In step 1122 the advertising service 400 receives bids from multiple advertisers. In step 1124, the bid analysis unit 414 of the advertising service analyzes the received bids and selects a winning bid. In step 1126 the instruction 412 of the advertising service 400 sends information to the video player software application 200 indicating which first advertisement video should be played to the user.

The method then proceeds to 1128, where a check is performed to determine if the user has issued a play command. If not, step 1128 is repeatedly performed until it is determined that the user has issued a play command, in which case the method proceeds to step 1130 and the video player software application 200 plays the first video advertisement and then the second video that was originally loaded into the video player software application during the initialization step 1102. The method then ends.

A method as explained above in connection with FIG. 11 has multiple advantages over a traditional method for obtaining a video advertisement, such as the one illustrated in FIG. 10. First, if a partner advertising provider 300 provides a bid price which is equal to or higher than the preset floor price established by the website publisher, the bid received from the partner advertising provider will already include the information needed by a video player software application 200 to obtain and play the first video advertisement. As a result, the video player software application can much more rapidly obtain the first video advertisement than would be possible with the far more detailed procedures that must be followed to obtain a first video advertisement from a typical advertising service 400. As a result, it is unlikely that there would be any significant delay between the time that a user issues a play command and the time that play of the first video advertisement begins. The elimination of any delay before the video begins to play is very helpful in keeping the user's attention.

In addition, regardless of whether the video advertisement is obtained from a partner advertising provider or from a traditional advertising service, the information needed to obtain and play the first video advertisement will be acquired in many cases before the user issues a play command. Note, in the method illustrated in FIG. 10, which is a traditional method for obtaining a first video advertisement, the method does not begin until the user issues the play command. In contrast, with the method as illustrated in FIG. 11, regardless of how the first video advertisement is obtained, the steps needed to obtain the first video advertisement are performed immediately after initialization of the video player software application, without the need for the user to first issue a play command.

In addition, when partner advertising providers are involved, they know that they are bidding not just against other partner advertising providers, but also against the floor price that is established by the website publisher. This can result in the partner advertising providers making a larger bid than they otherwise would when competing only against other partner advertising providers. Thus, website publishers may increase their advertising revenue.

Moreover, a method as illustrated in FIG. 11 may enable the website publisher to exert greater control over the entire process than in a method as illustrated in FIG. 10, which utilizes a traditional advertising service 400. Often the website publisher has an exclusive arrangement with only a single advertising service, and it is the advertising service that decides which bids to accept from advertisers. In a method as illustrated in FIG. 11, it is the website publisher that establishes the floor price they will accept from a partner advertising provider. It is only when no bid from a partner advertising provider exceeds the floor price established by the website publisher that the website publisher resorts to the services of a typical advertising service 400.

Figure 12:
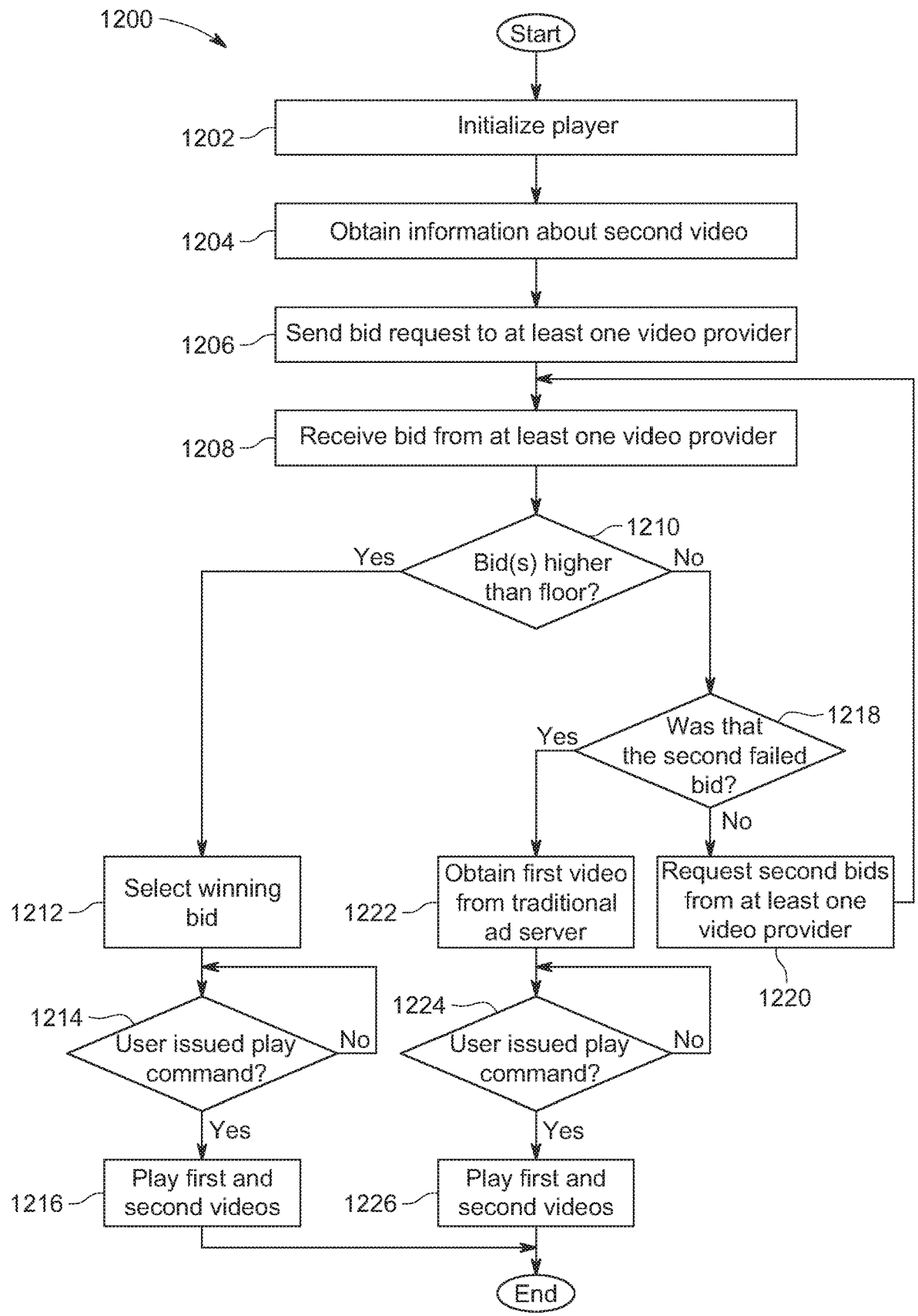
FIG. 12 is a flowchart illustrating steps of yet another method for obtaining and playing video content.

FIG. 12 illustrates steps of another method embodying the invention. In this method, bid requests are sent to partner advertising providers, and the bids that they return are compared to a preset price floor. If none of the bids submitted by the partner advertising providers is determined to be equal to or greater than the present price floor, the partner advertising providers are given a second chance to submit higher bids.

The method 1200 begins and proceeds to step 1202 where a video player software application 200 is initialized as a webpage is rendered by a browser. In step 1204, a data acquisition unit 202 the video player software application 200 obtains information which can be passed on to the partner advertising providers who will bid for playing a video advertisement. In step 1206, the bid request unit 204 of the video player software application 200 sends bid requests to multiple partner advertising providers. The partner advertising providers then generate and send bids back to the bid analysis unit 206 of the video player software application 200. Those bids are received by the bid analysis unit 206 in step 1208.

In step 1210, the prices within the bids submitted by the partner advertising providers are compared to a preset price floor set by the website publisher. If one or more of the bids is above the preset price floor, the method proceeds to step 1212, and one of the bids is selected as the winning bid. The method then proceeds to step 1214 where a check is performed to determine if the user has issued a play command. This step repeats until the check performed in step 1214 indicates the user has issued a play command. The method then proceeds to step 1216 where the first video advertisement associated with the winning bid is played by the player unit 808 of the video player software application 200, and then the second video loaded into the video player software application 200 during initialization step is played to the user. The method then ends.

If the analysis performed in step 1210 indicates that none of the bids were above the preset price floor, the method proceeds to step 1218. In step 1218, a check is performed to determine if the failed bid was a second failed bid attempt by the video advertising providers. If not, indicating that this was the first failed bid attempt, the method proceeds to step 1220 where a second bid request is sent to the partner advertising providers. The second bid request is marked in some way to indicate this is that this is a repeat bid request because a first set of bids associated with a first bid request all failed to rise above the preset price floor set by the website publisher. The method then proceeds again through steps 1208 and 1210.

During the second performance of step 1210, a check is performed to determine if one of the second bids provided by the partner advertising providers is equal to or greater than the preset price floor. If so, the method proceeds on to steps 1212, 1214 and 1216, as explained above. The method then ends after play of the second video.

If the second performance of step 1210 indicates that the second bids also were all below the preset price floor, the method again proceeds to step 1218. During the second performance of step 1218 it will be determined that this was the second failed bid attempt, which will result in the method proceeding to step 1222. In step 1222, the traditional method of obtaining a first video advertisement from an advertising service, as described in connection with FIG. 10, is performed to obtain the identification of a first video advertisement that will be played. The method then proceeds to step 1224, where a check is performed to determine if the user has issued a play command. Step 1224 is repeatedly performed until the user has issued a play command. The method then proceeds to step 1226, with a first video advertisement and the second video being played to the user. The method then ends.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as JavaScript, Java®, Swift or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 13:
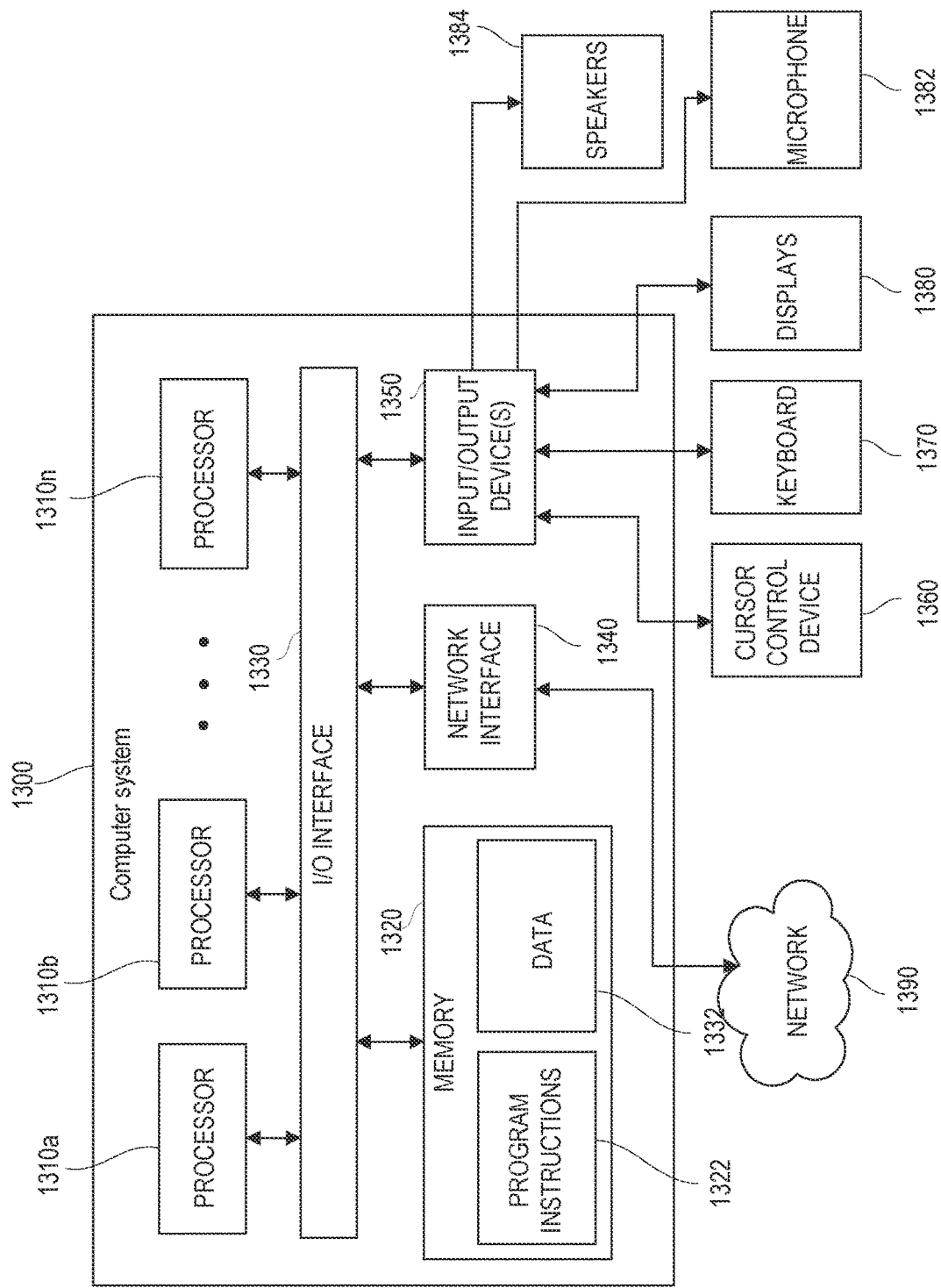
FIG. 13 is a diagram illustrating elements of a computer system and associated peripherals which could embody various aspects of the invention.

FIG. 13 depicts a computer system 1300 that can be utilized in various embodiments of the present invention to implement the invention according to one or more embodiments. The various embodiments as described herein may be executed on one or more computer systems, which may interact with various other devices. One such computer system is the computer system 1300 illustrated in FIG. 13. The computer system 1300 may be configured to implement the methods described above. The computer system 1300 may be used to implement any other system, device, element, functionality or method of the above-described embodiments. In the illustrated embodiments, the computer system 1300 may be configured to implement the disclosed methods as processor-executable executable program instructions 1322 (e.g., program instructions executable by processor(s) 1310) in various embodiments.

In the illustrated embodiment, computer system 1300 includes one or more processors 1310*a*-1310*n* coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, display(s) 1380, microphone 1382 and speakers 1384. In various embodiments, any of the components may be utilized by the system to receive user input described above. In various embodiments, a user interface may be generated and displayed on display 1380. In some cases, it is contemplated that embodiments may be implemented using a single instance of computer system 1300, while in other embodiments multiple such systems, or multiple nodes making up computer system 1300, may be configured to host different portions or instances of various embodiments. For example, in one embodiment some elements may be implemented via one or more nodes of computer system 1300 that are distinct from those nodes implementing other elements. In another example, multiple nodes may implement computer system 1300 in a distributed manner.

In different embodiments, the computer system 1300 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be general-purpose or embedded processors implementing any of a variety of instruction set architectures (ISAs). In multiprocessor systems, each of processors 1310 may commonly, but not necessarily, implement the same ISA.

System memory 1320 may be configured to store program instructions 1322 and/or data 1332 accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1320. In other embodiments, program instructions and/or data may be received, sent or stored upon different types of computer-accessible media or on similar media separate from system memory 1320 or computer system 1300.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network (e.g., network 1390), such as one or more external systems or between nodes of computer system 1300. In various embodiments, network 1390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or accessing data by one or more computer systems 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

In some embodiments, the illustrated computer system may implement any of the operations and methods described above, such as the methods illustrated by the flowcharts of FIGS. 5-12. In other embodiments, different elements and data may be included.

Those skilled in the art will appreciate that the computer system 1300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method performed by an instantiation of a video player software application on a rendered webpage that is being presented to a user on a display screen, the method generating a viewability score for the instantiation of the video player software application, comprising:

obtaining, with the instantiation of the video player software application, information that pertains to a viewability of the instantiation of video player software application on the rendered webpage, wherein the information comprises at least one of information about a viewability of a prior video that the instantiation of the video player software application previously played to the user, information about user-performed actions that were previously taken by the user, and information that is indicative of a degree of engagement that the user had with a prior video that the instantiation of the video player software application previously played to the user; and generating, with the instantiation of the video player software application, a viewability score for the instantiation of the video player software application using the obtained information, where the viewability score represents a degree of confidence that the instantiation of the video player software application will be located on a portion of the webpage that appears on the display screen when a new video plays within the instantiation of the video player software application, and where the higher the viewability score, the greater the likelihood that the instantiation of the video player software application will be located on a portion of the webpage that appears on the display screen when a new video plays within the instantiation of the video player software application.

2. The method of claim 1, wherein the viewability score represents a degree of confidence that the instantiation of the video player software application will be located on a portion of the webpage that appears on the display screen for at least a predetermined period of time when a new video plays within the instantiation of the video player software application.

3. The method of claim 1, wherein obtaining information comprises obtaining information about a viewability of a prior video that the instantiation of the video player software application played to the user before the generating step is performed.

4. The method of claim 1, wherein obtaining information comprises obtaining information about user-performed actions that were previously taken by the user before the generating step is performed.

5. The method of claim 4, wherein the user-performed actions are user-performed actions taken in connection with play of a prior video that the instantiation of the video player software application played to the user before the generating step is performed.

6. The method of claim 1, wherein obtaining information comprises obtaining information that is indicative of a degree of engagement that the user had with a prior video that the instantiation of the video player software application played to the user before the generating step is performed.

7. The method of claim 1, further comprising:

sending, with the instantiation of the video player software application, a first bid request to at least one video provider, where the first bid request includes the viewability score;

receiving, at the instantiation of the video player software application from the at least one video provider, a first bid for playing a first proposed video to the user, where the first bid includes data that enables the instantiation of the video player software application to obtain and play the first proposed video; and playing the first proposed video to the user with the instantiation of the video player software application when the user issues a play command.

8. The method of claim 7, further comprising:

collecting, with the instantiation of the video player software application, information that pertains a viewability of the first proposed video while the instantiation of the video player software application is playing the first proposed video to the user;

generating, with the instantiation of the video player software application, an updated viewability score using both the obtained information and the collected information;

sending, with the instantiation of the first video player software application, a second bid request to at least one video provider, where the second bid request includes the updated viewability score;

receiving, at the instantiation of the video player software application from the at least one video provider, a second bid for playing a second proposed video to the user, where the second bid includes data that enables the instantiation of the video player software application to obtain and play the second proposed video; and playing the second proposed video to the user with the instantiation of the video player software application when the user issues a play command.

9. The method of claim 8, wherein collecting information comprises collecting information about user-performed actions that were taken by the user in connection with play of the first proposed video.

10. The method of claim 8, wherein collecting information comprises collecting information that is indicative of a degree of engagement that the user had with the first proposed video when the first proposed video was played to the user.

11. A non-transitory computer readable medium having instructions stored thereon which, when performed by one or more processors of a computer system, cause the one or more processors to perform a method comprising:

obtaining, with an instantiation of a video player software application, information that pertains to a viewability of the instantiation of video player software application on a rendered webpage that is being presented to a user on a display screen, wherein the information comprises at least one of information about a viewability of a prior video that the instantiation of the video player software application previously played to the user, information about user-performed actions that were previously taken by the user, and information that is indicative of a degree of engagement that the user had with a prior video that the instantiation of the video player software application previously played to the user; and generating, with the instantiation of the video player software application, a viewability score for the instantiation of the video player software application using the obtained information, where the viewability score represents a degree of confidence that the instantiation of the video player software application will be located on a portion of the webpage that appears on the display screen when a new video plays on the instantiation of the video player software application.

12. A system for generating a viewability score for an instantiation of a video player software application on a rendered webpage that is being presented to a user on a display screen, comprising:

a memory configured to store computer processor instructions; and at least one processor, wherein the at least one processor is configured to perform a method comprising:

obtaining, with the instantiation of the video player software application, information that pertains to a viewability of the instantiation of video player software application on the rendered webpage, wherein the information comprises at least one of information about a viewability of a prior video that the instantiation of the video player software application previously played to the user, information about user-performed actions that were previously taken by the user, and information that is indicative of a degree of engagement that the user had with a prior video that the instantiation of the video player software application previously played to the user; and generating, with the instantiation of the video player software application, a viewability score for the instantiation of the video player software application using the obtained information, where the viewability score represents a degree of confidence that the instantiation of the video player software application will be located on a portion of the webpage that appears on the display screen when a new video plays on the instantiation of the video player software application, and where the higher the viewability score, the greater the likelihood that the instantiation of the video player software application will be located on a portion of the webpage that appears on the display screen when a new video plays on the instantiation of the video player software application.

13. The system of claim 12, wherein the viewability score represents a degree of confidence that the instantiation of the video player software application will be located on a portion of the webpage that appears on the display screen for at least a predetermined period of time when a new video plays on the instantiation of the video player software application.

14. The system of claim 12, wherein obtaining information comprises obtaining information about a viewability of a prior video that the instantiation of the video player software application played to the user before the generating step is performed.

15. The system of claim 12, wherein obtaining information comprises obtaining information about user-performed actions that were previously taken by the user before the generating step is performed.

16. The system of claim 15, wherein the user-performed actions are user-performed actions taken in connection with play of a prior video that the instantiation of the video player software application played to the user before the generating step is performed.

17. The system of claim 12, wherein obtaining information comprises obtaining information that is indicative of a degree of engagement that the user had with a prior video that the instantiation of the video player software application played to the user before the generating step is performed.

18. The system of claim 12, wherein the method further comprises:
- sending, with the instantiation of the video player software application, a first bid request to at least one video provider, where the first bid request includes the viewability score;
- receiving, at the instantiation of the video player software application, from the at least one video provider, a first bid for playing a first proposed video to the user, where the first bid includes data that enables the instantiation of the video player software application to obtain and play the first proposed video; and
- playing the first proposed video to the user with the instantiation of the video player software application when the user issues a play command.

19. The system of claim 18, wherein the method further comprises:
- collecting information that pertains a viewability of the first proposed video while the instantiation of the video player software application is playing the first proposed video to the user;
- generating, with the instantiation of the video player software application, an updated viewability score using both the obtained information and the collected information;
- sending a second bid request to at least one video provider with the instantiation of the video player software application, where the second bid request includes the updated viewability score;
- receiving, at the instantiation of the video player software application, from the at least one video provider, a second bid for playing a second proposed video to the user, where the second bid includes data that enables the instantiation of the video player software application to obtain and play the second proposed video; and
- playing the second proposed video to the user with the instantiation of the video player software application when the user issues a play command.

20. The system of claim 19, wherein collecting information comprises collecting information about user-performed actions that were taken by the user in connection with play of the first proposed video.

21. The system of claim 19, wherein collecting information comprises collecting information that is indicative of a degree of engagement that the user had with the first proposed video when the first proposed video was played to the user.

\* \* \* \* \*